(12) United States Patent
Pickens et al.

(10) Patent No.: US 12,147,759 B2
(45) Date of Patent: Nov. 19, 2024

(54) SYSTEMS AND METHODS FOR DOCUMENT ANALYSIS TO PRODUCE, CONSUME AND ANALYZE CONTENT-BY-EXAMPLE LOGS FOR DOCUMENTS

(71) Applicant: Open Text Holdings, Inc., San Mateo, CA (US)

(72) Inventors: Jeremy Garner Pickens, Bloomville, NY (US); Andrew Nelson Bye, San Francisco, CA (US); Thomas Chester Gricks, III, Irwin, PA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

(21) Appl. No.: 17/851,513

(22) Filed: Jun. 28, 2022

(65) Prior Publication Data

US 2023/0419026 A1    Dec. 28, 2023

(51) Int. Cl.
*G06F 40/194* (2020.01)
*G06F 16/35* (2019.01)
*G06F 40/20* (2020.01)

(52) U.S. Cl.
CPC ............ *G06F 40/194* (2020.01); *G06F 16/35* (2019.01); *G06F 40/20* (2020.01)

(58) Field of Classification Search
CPC ......... G06F 40/194; G06F 16/35; G06F 40/20
See application file for complete search history.

(56) References Cited

U.S. PATENT DOCUMENTS

| | | | |
|---|---|---|---|
| 6,847,984 B1 | 1/2005 | Midgley | |
| 7,293,033 B1* | 11/2007 | Tormasov | G06F 16/10 707/999.009 |
| 8,056,128 B1 | 11/2011 | Dingle | |
| 8,290,962 B1* | 10/2012 | Chu | G06F 16/319 715/228 |
| 8,363,961 B1 | 1/2013 | Avidan | |
| 8,528,084 B1 | 9/2013 | Dingle | |
| 8,539,591 B2 | 9/2013 | Eguchi | |
| 8,640,251 B1* | 1/2014 | Lee | G06F 16/164 707/786 |
| 11,775,522 B2 | 10/2023 | Sharon | |
| 12,019,667 B2 | 6/2024 | Pickens | |
| 2012/0310951 A1 | 12/2012 | Kumar | |
| 2014/0047507 A1 | 2/2014 | Chang | |
| 2015/0205968 A1 | 7/2015 | Aiello | |
| 2017/0118271 A1 | 4/2017 | Reyes | |
| 2018/0373711 A1 | 12/2018 | Ghatage | |
| 2020/0278953 A1 | 9/2020 | Yang | |
| 2021/0103629 A1 | 4/2021 | Kiryu | |

(Continued)

OTHER PUBLICATIONS

Office Action for U.S. Appl. No. 17/851,506, mailed Oct. 18, 2023, 20 pgs.

(Continued)

*Primary Examiner* — Allen S Lin
(74) *Attorney, Agent, or Firm* — Sprinkle IP Law Group

(57) ABSTRACT

Document analysis systems and methods for the generation of a content-by-example log that expresses withheld documents in terms of a set of disclosed documents are disclosed. Additionally, document analysis systems and methods for the analysis of such a content-by-example log to determine withheld documents of interest without access to those withheld documents are disclosed.

20 Claims, 15 Drawing Sheets

(56) References Cited

U.S. PATENT DOCUMENTS

2022/0019682 A1* 1/2022 Sislow ................ H04L 67/562
2023/0064367 A1 3/2023 Satish
2023/0041883 A1 12/2023 Pickens
2023/0418857 A1 12/2023 Pickens
2024/0289372 A1 8/2024 Pickens

OTHER PUBLICATIONS

Abril, Daniel, Navarro-Arribas, Guillermo and Torra, Vicenc, "Towards a Private Vector Space Model for Confidential Documents," Proceedings of the 28th Annual ACM Symposium on Applied Computing, 2013, pp. 944-945.
Office Action for U.S. Appl. No. 17/851,493, mailed Mar. 6, 2024, 7 pgs.
Office Action for U.S. Appl. No. 17/851,493, mailed Nov. 17, 2023, 22 pgs.
Office Action for U.S. Appl. No. 17/851,506, mailed May 10, 2024, 22 pgs.
Office Action for U.S. Appl. No. 17/851,506, mailed Sep. 6, 2024, 24 pgs.

* cited by examiner

SYSTEMS AND METHODS FOR DOCUMENT ANALYSIS TO PRODUCE, CONSUME AND ANALYZE CONTENT-BY-EXAMPLE LOGS FOR DOCUMENTS

TECHNICAL FIELD

This disclosure relates generally to analysis and characterization of electronic documents. In particular, this disclosure relates to the analysis of a potentially large corpus of documents that includes a disclosed set of documents and a withheld set of documents to characterize, and to provide, analyze, or otherwise utilize information about, the withheld set. Even more specifically, embodiments of this disclosure relate to analysis of documents of a disclosed set of documents of a corpus, or a withheld set of documents of a corpus, to provide information on the withheld documents in terms of the disclosed set of documents, or other available documents; and the analysis of such provided information to identify withheld documents of interest.

BACKGROUND

In the modern world, the vast majority of documents that are being created, utilized and maintained are in electronic format. A number of different situations commonly arise that require an analysis or identification of certain electronic documents that may be responsive or relevant (used interchangeably) to an information request, from within a relatively large pool of available electronic documents. These types of document analysis problems (e.g., information retrieval problems or machine learning problems) crop up in a wide variety of contexts. To aid users in resolving these problems, a document analysis system may be provided in a given electronic context. A document analysis system is typically used to allow users to analyze, review, navigate or search the electronic information to return or analyze responsive electronically stored information.

Accordingly, there is constantly a need for improved systems and methods for document analysis to assist in the analysis, review, navigation, or search of such electronic documents.

SUMMARY

As mentioned above, the vast majority of documents currently being created, utilized and maintained are in electronic format. As a result, a number of different situations commonly arise that require an analysis or identification of certain relevant electronic documents from a pool of available electronic documents (referred to as a corpus). These types of document analysis problems (e.g., information retrieval problems or machine learning) crop up in a wide variety of contexts.

For example, in litigation, an entity's documents may need to be reviewed in order to identify documents that may be relevant to one or more issues in a litigation and, more specifically, responsive to one or more requests for production of documents. In other examples, certain regulatory filings may require review of a number of documents to identify documents that may be relevant to one or more issues in the regulatory filing. In another example, in a request submitted to a government agency (such as Freedom of Information Act (FOIA) request) asking for records on a particular topic, a number of documents responsive to that request may need to be identified. As still another example, a search request for a corpus of documents (e.g., an enterprise's documents on their intranet) may entail identification of documents that are responsive to the search.

Further, there may be a need to disclose to another entity those documents determined to be relevant or responsive. In many cases, however, certain documents of a corpus may be withheld from such a disclosure, even in instances where such documents of the corpus may have been identified as relevant. To continue with the above examples, in a litigation context certain documents may be identified as responsive to a request for production but may nonetheless be withheld because they are identified as privileged (e.g., as privileged communication between attorney and client) Similarly, documents may be identified as responsive to a FOIA request but may be withheld because they fall under one of FOIA's nine exemptions or three exclusions (e.g., they include classified documents pertinent to national defense or foreign policy, documents including internal personnel rules, documents contain person's private information, documents including trade secrets, etc.). As another example, documents responsive to a search may not be identified in (e.g., withheld from) results for that search because a user who initiated the search does not have an entitlement to access such documents (e.g., does not have security clearance, is not high enough in the organization, is not of a particular group or does not have a particular role, etc.).

In such instances where documents are withheld, there may also be a need to identify to another party (e.g., a requesting party, consuming, or receiving party, used interchangeably) those withheld documents, including data characterizing the withheld documents or the rationale for withholding those documents. It may be helpful to illustrate a specific example of such a scenario in more detail. As discussed, parties to litigation usually have to share responsive documents with opposing counsel through the discovery process. Typically, one party (the requesting, consumer, or receiving party, used here interchangeably) makes a request for documents (e.g., a production request) to another party (e.g., the producing or disclosing party), where the request generally describes the documents of interest. The other (producing) party makes a reasonable search of their records based on the identifying information to locate the documents responsive to the request.

Of the identified documents, the (producing) party may determine that a certain number of the documents are "privileged" (e.g., subject to a rule that protects certain documents from compelled disclosure in a court proceeding). In other words, in the determination of the (producing) party, these privileged documents may be withheld from disclosure from the requesting party regardless of the responsiveness of those documents to the request. The (producing) party then discloses (e.g., produces, shares, or identifies) the documents resulting from the search that are not privileged to the other (requesting) party while withholding documents that, although deemed responsive to the request, have been determined by that (producing) party to be privileged.

In most jurisdictions, however, there is a requirement that if a producing party withholds documents it deems to be privileged it must also provide information to the requesting party that allows the requesting party to assess or dispute that claim of privilege. For example, Federal Rule of Civil Procedure 26(b)(5) states that a party withholding otherwise discoverable material under a claim of privilege must describe the nature of the documents "in a manner that, without revealing information that is itself privileged, will enable other parties to assess the claim [of privilege]".

Namely, the description must contain sufficient information about the nature of the documents to permit the receiving party to analyze claims of privilege. These descriptions should have enough details to withstand judicial scrutiny, and courts reserve the right to reject logs that are vague.

To comply with this obligation and identify withheld documents (e.g., to the requesting party), including data related to a withheld document or why those documents are being withheld, a privilege log is generally used. A privilege log typically identifies privileged documents that are being withheld, and describes basic information about each withheld document including the date, author or recipients, or subject matter, along with the identification of the specific privilege being asserted. There is, however, no requisite format or method of generation of such privilege logs, and privilege logs can take several different forms (e.g., categorical privilege logs, metadata privilege logs).

Accordingly, one of the many logistical challenges in litigation is how to adequately log such withheld privileged documents. The obligation to log privileged documents often causes considerable difficulty in complex litigations because of the large number of responsive privileged documents. This situation occurs in no small part because of the typical manner of generating such privilege logs. Traditionally, privilege logs are generated manually on a document-by-document basis. As such, a person from the producing party must manually review each document and then manually describe its contents on the privilege log. This can be highly burdensome, time consuming, and expensive, especially in complex litigations with such large numbers of privileged responsive documents.

In any event, once such a privilege log for withheld documents is created it is produced to the requesting party in addition to the disclosed documents responsive to the request for production. These claims of privilege by a producing party are, however, not sacrosanct. A receiving party may challenge claims of privilege to obtain (1) more information about the claim of privilege, (2) more information on the withheld document, or (3) to actually obtain the withheld document itself. But, similar to the creation of the privilege log, the decision of which, if any, claims of privilege for withheld documents should be challenged by the receiving party entails a significant amount of time, resources, and cost. This situation arises because the onus of analyzing every claim of privilege and making such challenges falls entirely on the requesting party.

Accordingly, the information associated with each withheld document in the privilege log may need to be analyzed by the requesting party to determine which documents should be challenged. This analysis may take into account a myriad of factors given the real-world desire to limit the number of challenges to privilege (e.g., an attorney may not wish to spend the money or resources, or risk the ire of a judge, by issuing too many challenges), along with the dual inquiries of (1) whether enough is already known about the full scope of possible topics that appear to be covered in the privileged documents (referred to as coverage) and (2) whether enough is already known about the specific substance of topics in the privileged documents that really matter to the litigation (e.g., the topics determined to be important or "hot"—referred to as focus).

Moreover, because of the limited information provided in typical privilege logs, such decisions about which documents to challenge may be highly uncertain or even inaccurate. As such, the analysis of privilege logs to determine which privileged documents may be of sufficient interest to the requesting party to warrant challenging may likewise be fraught with difficulty, and highly burdensome, time consuming, and expensive. Similarly as well, such difficulties are also exacerbated in complex litigations with such large numbers of privileged documents.

Litigation thus represents a microcosm of a more general problem raised by the high volume, and increasing presence and use of, electronic documents across a variety of different contexts. Namely, how can a large volume of electronic documents, some of which are going to be disclosed and some of which are to be withheld, be analyzed to characterize, and provide, or utilize, sufficient information to make decisions about the withheld set. In other words, one party has access to both the documents to be disclosed and the withheld documents, while the other party may only have access to the documents which the producing party deigns to disclose. Even more specifically, then, in the presence of such an information gap (e.g., between the producing and receiving parties) how can the disclosed documents from such a corpus of documents be analyzed and used to provide adequate information on the withheld documents, and how can the provided information on the withheld documents be analyzed to determine which withheld documents might be of interest (e.g., incorrectly or improperly withheld given the context) in the absence of access to those withheld documents themselves. This determination may, for example, allow a receiving party to contest the withholding of selected ones of the document of interest (e.g., by challenging a claim of privilege to such documents).

To address these issues, among others, attention is now directed to the embodiments of document analysis systems and methods disclosed herein. Specifically, embodiments of such a document analysis system may be utilized to generate a content-by-example log for each of a first set of documents in terms of a second set of documents. A content-by-example log will be understood herein to mean any structure which identifies a first set of documents to which one entity (or party, used here interchangeably) may not have access (referred to without loss of generality as the withheld set), where the content-by-example log additionally identifies a set of example documents (the example, or similar, set), similar to each identified document of the first set, and each of the example documents is from a second set of documents to which the entity does have access (referred to without loss of generality as the disclosed set).

In particular, in certain embodiments, a corpus of documents may be separated into two sets of documents, a set of documents to be withheld and a set of documents to be disclosed. Each document of the withheld set may be analyzed against documents of the disclosed set using a similarity function to determine a subset of documents from within the disclosed set that are most similar to that withheld document. The type of similarity function utilized, or the parameters or other configurations (e.g., thresholds, weightings, etc.), of the similarity function may be determined or specified by (1) the document analysis system, (2) the entity generating the content-by-example log, (3) some negotiation or agreement between the two entities, (4) a third party (e.g., a judge or magistrate), or (5) by some other method entirely. In this manner, a set of similar documents from among the disclosed documents (e.g., the 3, 5, 10, etc. most similar documents) may be determined for, and associated with, each of the withheld documents.

The content-by-example log can then be formed by associating an identifier (e.g., a document identification number or "DocID") for each withheld document with an identifier for each of the set of similar (example) documents of the disclosed set associated with that particular withheld document. The content-by-example log may also be configured to include other information about the withheld documents or associated example documents. For example, the example documents may be included as a list ordered by similarity to the withheld document with which they are associated, or further may include a similarity score quantifying the similarity of an example document to an associated withheld document. As another example, additional information about the withheld document may be provided as well, such as metadata regarding the withheld document, information regarding why the document is being withheld (e.g., a claim of privilege), information about why the set of example documents associated were determined to be similar to the associated withheld document, etc.

As can be seen then, embodiments may prove particularly useful in the context where one party (a requesting party) requests documents from another party (the producing party) and the producing party may disclose documents identified as responsive to the information request, while also withholding a separate set of documents, even though they are identified as responsive to that request. In such instances, the requesting party may have access to the disclosed documents while the producing party would likely have access to both the disclosed documents and the withheld documents. Moreover, the producing party may desire (or be required) to identify to the requesting party the withheld documents, including data related to the withheld documents or why those documents are being withheld.

Such a situation may occur, for example, in a litigation context or a FOIA request context, among others. As but one useful example, embodiments may be used to generate a privilege log in a litigation context. Specifically, embodiments may obtain a corpus of documents that includes a set of documents determined to be responsive to a discovery request and determine which of those documents are to be disclosed (e.g., are non-privileged) and which of those documents are to be withheld as privileged. Here, a content-by-example log may be generated by associating an identifier for each withheld privileged document with an identifier for each of a set of similar (example) documents of the disclosed (non-privileged) set associated with that particular withheld (privileged) document. Such a content-by-example log may serve as a privilege log for the withheld (privileged) documents and be provided to the requesting party. Moreover, other standard information such as metadata and tagged category (e.g., "work product" or "attorney client") information may be added to the content-by-example log (that will be utilized as the privilege log) such that the content-by-example log may include similar information to that found in typical privilege logs.

It will be noted herein at this point, that while embodiments as described herein may be useful in a litigation context during discovery or in other document production contexts, and embodiments may be described in such a context for ease of reference and understanding, other embodiments may be utilized in almost any scenario where it may be desirable to generate a content-by-example log to be provided to an entity for documents to which that entity does not have access, by specific reference to documents to which that entity does have access. More specifically then, the descriptions of embodiments and their contexts (e.g., use in litigation or discovery) are to be taken as examples only without loss of generality and all such descriptions provided in such specific contexts will be understood also to apply generally. To illustrate, any document described as privileged may be understood as a specific example of a withheld document, and all descriptions of embodiments in association with the specific example of privileged documents will be understood to also apply to the more general case of withheld documents. Similarly, any discussion of embodiments with respect to the specific example of non-privileged documents will also be understood to apply to the more general case of disclosed documents.

More broadly then, when a content-by-example log (such as a privilege log) is created it can be provided to another party (e.g., the requesting party) that does not have access to the withheld documents, but who may have access to the disclosed documents. This other (requesting) party may, however, wish to obtain additional information on withheld documents, or dispute or challenge the withholding of particular documents. In the litigation context, for example, a requesting party may wish to challenge claims of privilege to obtain (1) more information about the claim of privilege, (2) more information on the withheld document, or (3) to actually obtain the withheld document itself. The decision of which, if any, withheld documents should be challenged entails a significant amount of resources and cost by the receiving party. This situation arises because the onus of making such challenges falls almost entirely on the requesting party.

Accordingly, the information associated with each withheld (e.g., privileged) document in the privilege log may need to be analyzed by the requesting party to determine which documents should be challenged. This analysis may take into account a myriad of factors given the real-world desire to limit costs, time, or the number of challenges to privilege (e.g., an attorney may not wish to spend the money or resources, or risk the ire of a judge, by issuing too many challenges), along with the dual inquiries of (1) whether enough is already known about the full scope of possible topics that appear to be covered in the privileged documents (referred to as coverage) and (2) whether enough is already known about the specific substance of topics in the privileged documents that really matter to the litigation (i.e. the topics determined to be important or "hot"—referred to as focus). Stated another way, an entity may desire to determine which withheld (e.g., privileged) documents will add to, or supplement, that entity's knowledge the most, relative to what information the entity can glean from documents that have been disclosed, so the entity can prioritize which withheld (e.g., privileged) documents the entity desires to challenge. Moreover, it may be incumbent on such a challenging entity to show that the party that withheld the documents did so improperly (e.g., the entity's steps to preserve and produce relevant electronically stored information were inadequate). Such an improperly withheld document (e.g., an incorrect claim of privilege) clearly indicates such a production was, in fact, inadequate.

To those purposes, among others, embodiments of document analysis systems and methods disclosed herein may be utilized to analyze a content-by-example log that identifies a first set of documents to which an entity may not have access and a set of associated example documents similar to each identified document of the first set, where each of the identified example documents is from a second set of documents to which the entity does have access. In particular, embodiments may analyze a content-by-example log to determine a number of documents of the first set (e.g., withheld documents) on which an entity may wish to obtain more information (e.g., challenge).

To identify these withheld documents of interest from such a content-by-example log, embodiments of a document analysis system may create a feature vector for each of the withheld documents identified in the content-by-example log (and representing each withheld document) based on the example documents and any additional information associated with that withheld document in the content-by-example log. This feature vector may be generated by utilizing various information associated with the example documents as features, such as using the document identifiers for example documents as features, or further utilizing weighted terms, phrases or sections of the example document as the features. The feature vector for each withheld document can then be associated with the withheld document to form a feature vector index (e.g., an index of identifiers for a withheld document, associated directly or indirectly with a feature vector for that withheld document based on the associated example disclosed documents in the content-by-example log). Using this feature value index then, information retrieval techniques may be utilized to determine a set of the withheld documents of interest based on the associated feature vectors. Such a determination may be repeated as desired by the entity utilizing the document analysis system. The entity that received the content-by-example log can then choose to take some action based on the set of withheld documents of interest, such as challenging the withholding of the documents (e.g., requesting production of one or more of the withheld documents) or, minimally, requesting more information on why such documents were withheld.

Embodiments as presented herein may thus have a number of advantages. As one advantage, embodiments may efficiently generate and analyze content-by-example logs, increasing the speed of a computer producing and analyzing such content-by-example and the memory usage involved in the analysis of such content-by-example logs. Moreover, embodiments may avoid time-consuming and resource-intensive manual processes involved with the production of descriptions of withheld documents, such as the more intensive reviewing required for providing descriptions of the documents. Additionally, embodiments may provide a highly informative log that allows the receiver to better understand withheld documents by assessing similarities with disclosed documents, even in the absence of access to the withheld documents. Such capabilities may similarly allow receivers to more effectively identify withheld documents of interest, and therefore more effectively challenge the withholding of, and potentially obtain, withheld documents. In particular, embodiments may allow receivers to effectively analyze such withheld documents in terms of coverage and focus to efficiently and effectively determine which withheld documents may be of the most interest to such receivers. In turn, both producing and receiving parties will benefit from enhanced identification of withheld documents of interest, likely leading to a decrease in unnecessary challenges.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 is a diagram of one embodiment of a method for determining a content-by-example log.

DETAILED DESCRIPTION

Figures 1, 1A:
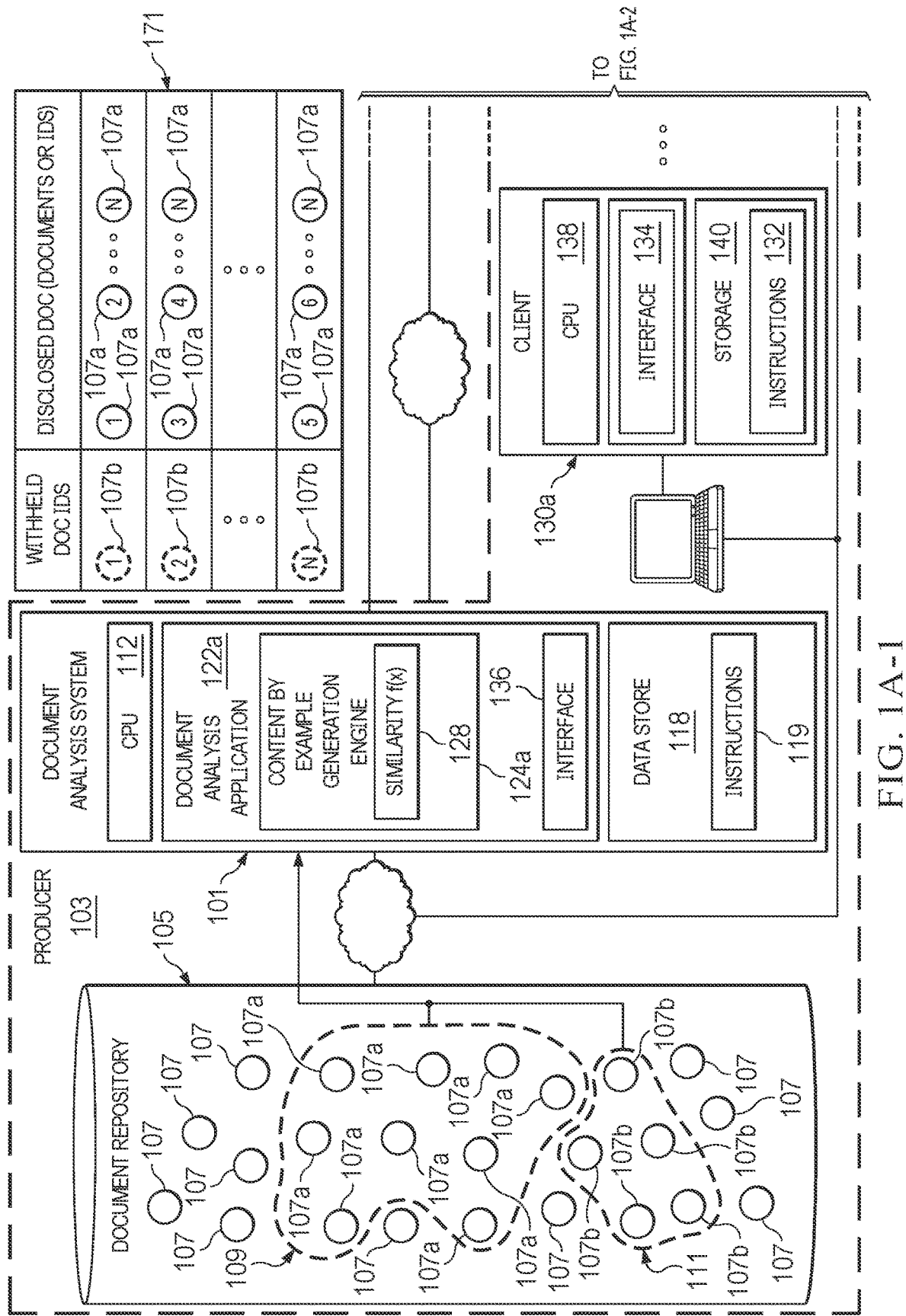
FIGS. 1A-1 and 1A-2 (hereinafter collectively referred to as 1A), and 1B-1 and 1B-2 (hereinafter collectively referred to as "1B") are block diagrams of embodiments of document analysis systems for both the producer and the receiver.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in detail, it may be helpful to discuss some context around document analysis systems. As discussed herein, a number of different situations commonly arise that require an analysis or identification of certain electronic documents from a relatively large pool of available electronic documents that may be responsive to a specific information request. To aid users in resolving these problems, a document analysis system may be provided in a given electronic context. A document analysis, document review, information retrieval, or search system (which all will be utilized here substantially interchangeably) is a computer system used to process a corpus of electronically stored information (referred to as the corpus), or information associated with a corpus of documents, and allow users to analyze, review or navigate the information, or search the electronic information to return electronically stored information responsive to a search (also referred to as a query). Items of electronic information that form a corpus may be referred to interchangeably as (electronic) documents, items, files, objects, items, content, etc. and may include objects such as files of almost any type including documents for various editing applications, emails, workflows, etc.

In the legal domain, as well as other domains, these document analysis systems may be utilized to review and analyze a large corpus of documents. For example, in litigation, an entity's documents may need to be reviewed in order to identify documents that may be responsive to one or more requests for production concerning relevant issues in litigation. In other examples, certain regulatory filings may require review of a number of documents to identify documents that may be relevant to one or more issues in the regulatory filing. In another example, in a request submitted to a government agency (such as Freedom of Information Act (FOIA) request) asking for records on a particular topic, a number of documents responsive to that request may need to be identified. As another example, a search request directed at a corpus (e.g., an enterprise's documents on their intranet) may identify documents that are responsive to the search.

Thus, such identified documents may be disclosed when they are identified as responsive to the search or information request. In many cases, however, documents of a corpus may be withheld from such a disclosure, even in instances where such documents of the corpus may have been identified as responsive. To continue with the above examples, in a litigation context certain documents may be identified as responsive to a request for production but may nonetheless be withheld because they are identified as privileged for some reason. Similarly, documents may be identified as responsive to a FOIA request but may be withheld because they fall under one of FOIA's nine exemptions or three exclusions (e.g., they include classified documents pertinent to national defense or foreign policy, documents including internal personnel rules, documents contain a person's private information, documents including trade secrets, etc.). As another example, documents responsive to a search that are identified as responsive may be withheld because a user who initiated the search does not have an entitlement to access such documents (e.g., does not have security clearance, is not high enough in the organization, is not of particular group or does not have a particular role, etc.).

In such instances where documents are withheld, there may also be a need to describe the withheld documents to another party (e.g., a requesting party), including providing data related to the withheld document or why those documents are being withheld. For example, in a litigation context, to comply with these types of requirements and identify withheld documents to the requesting party, including data related to a withheld document or the rationale for why those documents have been withheld, a privilege log may be used. A privilege log typically identifies privileged documents and describes basic information about each withheld document including the date, author or recipients, or subject matter, along with an explanation for why that document is privileged.

Once such a privilege log for withheld documents is created it can be produced to the requesting party in addition to the disclosed documents responsive to the request. A (receiving) party may, however, want to challenge claims of privilege—to obtain more information about the claim of privilege, more information on the withheld document, or to actually obtain the withheld document itself. But, similar to the creation of the privilege log, the decision of which, if any, withheld documents should be challenged entails a significant amount of resources and cost by the receiving party. Accordingly, the information associated with each withheld document in the privilege log may need to be analyzed by the requesting party to determine which documents should be challenged. The analysis of privilege logs to determine which of the documents identified in the privilege log may be of particular interest to the requesting party may likewise be fraught with difficulty, and highly burdensome, time consuming, and expensive.

Litigation thus represents a microcosm of a more general problem raised by the high volume, and increasing presence and use of, electronic documents across a variety of different contexts. Namely, how can a large volume of electronic documents, some of which are going to be disclosed and some of which are to be withheld, be analyzed to provide, or utilize, sufficient information to make decisions about the withheld set. In other words, one party has access to both the documents to be disclosed and the withheld documents, while the other party may only have access to the documents which the disclosing party discloses. Even more specifically, then, in the presence of such an information gap (e.g., between the producing and receiving parties) how can such a corpus of documents be analyzed to provide adequate information on the withheld documents in terms of the disclosed set of documents, and how can the provided information on the withheld documents be analyzed to determine which withheld documents may be of interest, in the absence of access to those withheld documents.

To address these issues, among others, attention is now directed to the embodiments of document analysis systems and methods disclosed herein. Specifically, embodiments of such a document analysis system may be utilized to generate a content-by-example log for each of a first set of documents in terms of a second set of documents. A content-by-example log will be understood herein to mean any structure which identifies a first set of documents, the withheld set, to which one entity may not have access, where the content-by-example log additionally identifies a set of example documents similar to each identified document of the first set, and each of the example documents is from a second set of documents to which the entity does have access.

In particular, in certain embodiments, a corpus of documents may be separated into two sets of documents, a set of documents to be withheld and a set of documents to be disclosed. Each document of the withheld set may be analyzed against documents of the disclosed set using a similarity function to determine a set of documents of the disclosed set most similar to that withheld document. The content-by-example log can then be formed by associating an identifier for each withheld document with an identifier for each of the set of similar (example) documents of the disclosed set associated with that particular withheld document.

When a content-by-example log (such as a privilege log) is created, it can be provided to another party (e.g., the requesting party) that does not have access to the withheld documents, but which may have access to the disclosed documents. This other party may, however, wish to obtain additional information on withheld documents, or dispute or challenge the withholding of particular documents. In the litigation context, for example, a receiving party may wish to challenge claims of privilege to obtain more information about the claim of privilege, more information on the withheld document, or to actually obtain the withheld document itself. The decision of which, if any, withheld documents should be challenged with respect to a declaration of privilege by the producing party entails a significant amount of resources and cost by the receiving party. This situation arises because the onus of making such challenges falls almost entirely on the requesting party.

Accordingly, the information associated with each withheld document in the privilege log may need to be analyzed by the requesting party to determine which documents should be challenged. To those purposes, among others, embodiments of document analysis systems and methods disclosed herein may also be utilized to analyze a content-by-example log. In particular, embodiments may analyze a content-by-example log to determine a number of documents of the first set (e.g., withheld documents) on which an entity may wish to obtain more information (e.g., challenge), or that may more generally be of greater interest to the entity relative to the other withheld documents of the content-by-example log.

Looking now at FIG. 1A, a block diagram of one embodiment of a document analysis system that generates a content-by-example log is depicted. The document analysis system 101 is part of a computing environment of a producer (e.g., a producing party) 103 that includes one or more document repositories 105 and one or more client computers 130*a* through 130*n*. Repository 105 may comprise a file server or database system or other storage mechanism remotely or locally accessible by document analysis system 101 which, according to an embodiment, may be almost any SQL or NoSQL platform such as MongoDB, Elasticsearch or the like. Repository 105 may store documents 107 that document analysis system 101 may allow users, via the document analysis system 101 (e.g., through clients 130) to access (e.g., to navigate, search, analyze, utilize, code, generate a content-by-example log for, etc.).

In the depicted embodiment, document analysis system 101 may include one or more (virtual or physical) servers or other type of computing device utilizing a central processing unit 112 connected to a memory and a data store 118 (e.g., via a bus). Central processing unit 112 may represent a single processor, multiple processors, a processor(s) with multiple processing cores and the like. Data store 118 may include a volatile or non-volatile non-transitory storage medium such as RAM, hard disk drives, flash memory devices, optical media or the like. Document analysis system 101 may be connected to a data communications network such as the Internet, a local area network (LAN), a wide area network (WAN), a cellular network or some other network or combination of networks.

Data store 118 stores computer executable instructions 119. Computer executable instructions 119 can represent one or more multiple programs or operating system instructions. In one embodiment, instructions 119 are executable to provide document analysis application 122*a*. Again, it will be noted here that while embodiments described and depicted herein may include a deployment of a document analysis system on a physical computing device, other embodiments may include the document analysis system deployed as a service on, for example, a cloud computing environment or otherwise deployed without loss of generality.

Client computer system 130 may include components similar to those of the server of document analysis system 101, such as CPU 138 and data store 140. Additionally, client computer system 130 may include executable instructions 132 to provide user interface 134 that allows a user to interact with document analysis system 101 to create a content-by-example log for documents 107 comprising the corpus. These instructions 132 may have, for example, been provided by document analysis system 101 in response to an access by client computer 130. For example, user interface 134 may be provided through a web browser, file system interface or other method without loss of generality. Moreover, user interface 134 may interact (e.g., issue requests, receive responses, etc.) with a corresponding interface 136 of the document analysis application 122*a*, which may be, for example a web services interface, an Application Programming Interface (API) or another type of interface.

Again, those skilled in the art will appreciate that document analysis system 101 shown in FIG. 1A is merely an example of a computing system and embodiments of a document analysis system that may be implemented using other computing systems (e.g., desktop computers, laptops, mobile computing devices, services platforms, cloud computing platforms or other computing devices or platforms with adequate processing and memory) including multiple computers acting together to provide a document analysis system (e.g., a cluster of servers or other computing devices connected by a network acting together to provide the document analysis system). Similarly, client computer system 130 may include any suitable desktop computer, laptop, mobile device, server, or other computing system.

The document analysis system 101 may provide content-by-example log generation capabilities to users reviewing the documents 107 of a corpus through document analysis application 122*a* (e.g., through interfaces 134 and 136). Specifically, the documents 107 of the repository 105 may comprise a corpus of documents 107. Accordingly, receiver 113 (e.g., a person affiliated with receiver computing environment 113) may make a request for documents 107 from the producer's 103 document repository 105. Such a request may include, for example, some set of terms, keywords or other information related to documents 107 of interest to the receiver (e.g., the requesting party) 113. The producer 103 (e.g., using document analysis system 101 or through some other methodology) may determine a set of documents relevant or responsive to the request. The corpus of documents 107 are thus separated into documents 107 that are responsive and not responsive to the information request from the receiver 113. This determination may be made in a variety of manners such as by being manually reviewed and marked as either responsive or not responsive, or designated by a machine learning algorithm (e.g., artificial intelligence classification algorithms), or that have otherwise been bulk coded or bulk determined based on some (e.g., deterministic) rule.

The documents 107 that are deemed relevant may further be separated (e.g., using a manual methodology, machine learning, deterministic or rule based approach, or by some other technique) into documents 107*a* that are determined to be disclosed to the receiver 113 and documents 107*b* which are determined to be withheld from the receiver 113 based on some criteria (e.g., privilege, national security restrictions, etc.). While these determinations are described as being accomplished in response to a request from a receiver 113, it will be noted that such determinations may be made for other reasons or based on other criteria or inputs, as would be understood by one of ordinary skill in the art.

In any event, the corpus of documents 107 includes a set 109 of documents 107a to be disclosed to receiver 113 and a set 111 of documents 107b to be withheld from the receiver 113. The receiver 113 may thus be provided with, or given access to, documents 107a of the disclosed set 109 of documents 107. For example, the documents 107a of the disclosed set 109 of documents 107 may be provided to the receiver 113 such that those documents 107a may be stored at a repository 115 associated with the receiver 113 and accessible by receiver 113.

Producer 103 may, however, withhold set 111 of documents 107b from receiver 113 despite that they may be relevant to the receiver's 113 request. Thus, receiver 113 may have no access to set 111 of documents 107b and have no awareness of the contents, type, or other information regarding such withheld documents 107b. Producer 103 may thus be required (or may otherwise desire) to provide information on the withheld documents 107b to the receiver 113.

Accordingly, the document analysis system 101 may provide content-by-example log generation capabilities to users reviewing the documents 107 of a corpus through document analysis application 122 (e.g., through interface 134). Using an interface (e.g., interface 134) a user at a client device 130 may indicate that a content-by-example log is to be generated for—one or more (or all) of the set 111 of withheld documents 107b. Content-by-example generation engine 124a may thus be adapted to generate such a content-by-example log for documents 107b of the withheld set 111 of documents 107. In particular, content-by-example generation engine 124a may analyze each (or a subset of) documents 107b of the withheld set 111 against documents 107a of the disclosed set 109 using a similarity function 128 to determine a set of documents 107a of the disclosed set most similar to each withheld document 107b. The type of similarity function utilized, or the parameters or other configurations (e.g., thresholds, weightings, etc.), of the similarity function may be determined or specified by (1) the document analysis system 101 (e.g., a configuration), (2) a user (e.g., a person affiliated with the producer 103) interacting with the document analysis application 122a through interface 134, (3) the receiver 113 (e.g., a person affiliated with the receiver 113) to whom the content-by-example log is to be provided, (4) some negotiation or agreement between the producer 103 and receiver 113, (5) a third party (e.g., a judge or magistrate), or (6) by some other method entirely. In this manner, content-by-example generation engine 124a may determine a set of similar documents of the disclosed documents 107a (e.g., the 3, 5, 10, etc. most similar documents) for each of the withheld documents 107b.

The content-by-example log 171 can then be formed by associating an identifier (e.g., a document identification number or "DocID") for each withheld document 107b with an identifier for each of the set of similar (example) documents 107a of the disclosed set 109 determined for that particular withheld document 107b (or by including the content of the disclosed document 107a itself). For example, in the content-by-example log 171 depicted, an identifier for withheld document 107b1 may be associated with identifiers for disclosed documents 107a1, 107a2, 107aN, indicating that disclosed documents 107a1, 107a2, 107aN are the most similar documents 107a of disclosed set 109 of documents 107 to withheld document 107b1. Similarly, withheld document 107b2 may be associated with identifiers for disclosed documents 107a3, 107a4, 107aN, indicating that disclosed documents 107a3, 107a4, 107aN are the most similar documents 107a of disclosed set 109 of documents 107 to withheld document 107b2.

It will be noted here again, that while disclosed documents 107a utilized to generate the content example log 171 are described and depicted as being a portion of a corpus of documents under the purview of producer 103, in other embodiments the disclosed documents 107a which may be utilized in generation of a content-by-example log may encompass substantially the universe (or a subset of the universe) of the documents accessible by both producer 103 and receiver 113 almost regardless of the source. For example, the set of disclosed documents may include documents publicly available through the Internet.

To describe examples of this more expansive document scope in a little more detail, in many contexts (such as litigation) there are document exchanges in both directions. In other words, producer 103 may produce documents to receiver 113 and receiver 113 may produce documents to producer 103. In such cases both entities may have disclosed documents and withheld documents. These disclosed and withheld documents may be used together. For example, let R(A) be the set of disclosed documents that entity A is giving to entity B. Let R(B) be the set of disclosed documents that entity B is giving to entity A. Let P(B) be the set of withheld documents that entity B is NOT giving to entity A. In various embodiments, entity B could create a content-by-example log for each document in P(B) expressed in terms of its similarity to all the documents in R(B). However, entity B could also (or instead) produce a content-by-example log in terms of each P(B) document's similarity to all the documents in R(A) as well, or a content-by-example log in terms of each P(B) document's similarity to a mixture of the two sets of documents, R(B) and R(A).

As can be seen, then, more plainly, the example documents in the content-by-example log produced by an entity (e.g., B) don't have to be only from a corpus solely under control of that entity (e.g., they can be from the corpus of A), so long as they are available to both A and B. The example documents can be from another entity's corpus (if the producing entity has access, such as when the other entity produces such documents), or the example documents can be from any other source to which both entities A and B have access. For example, they could be a set of public-facing company documents on the Internet, or tweets collected from a twitter stream, or publicly available government documents, or almost any available documents imaginable. Because again, the general concept is that an entity is creating a content-by-example log for documents that are inaccessible outside of that entity's domain, based on examples that are accessible both inside and outside of that entity's domain.

Moreover, in addition to providing identifiers for the example documents or the content of the example documents, the content-by-example log may also be adapted to include other information about the withheld documents 107b or associated example documents 107a of the disclosed set 109. For example, the example documents 107a may be included in the content-by-example log ordered in an order of similarity to the withheld document with which they are associated. To illustrate with respect to the depicted content-by-example log 171, the order of disclosed documents 107a1, 107a2, 107aN with respect to identified withheld document 107b1 may indicate that document 107a1 is the most similar disclosed document 107a to withheld document 107*b*1, document 107*a*2 is the next most similar disclosed document 107*a* to withheld document 107*b*1, etc. As an additional example, a similarly score may be associated with each of the identifiers of the disclosed documents 107*a* included in the content-by-example log to indicate a degree of similarity between that disclosed document 107*a* and the associated withheld document 107*b*. Such a similarity score, may for example, be a similarity score generated by the similarity function employed by content-by-example generation engine 124*a*. As another example, additional information about the withheld document 107*b* or its association with the example documents 107*a* may be provided as well in the content-by-example log, such as (by way of example and not limitation), (1) metadata regarding the withheld document (e.g., file type, file date, custodian (document owner), or people involved in communications, etc.), (2) information regarding why the document is being withheld (e.g., the claim of privilege or type of privilege being asserted), or (3) information about how the set of example documents associated were determined to be similar to the associated withheld document.

Once such a content-by-example log 171 is generated, it may be provided to the receiver 113. In this manner, a producing party 103 may provide information to the receiver 113 on the set of documents 107*b* withheld from the receiver 113 (but which may still be of interest to the receiver 113), in terms of disclosed documents 107*a* to which the receiver 113 has access. By providing example disclosed documents 107*a* to which the receiver has access for the withheld document 107*b* in this way the producer may meet their burden, requirement, or desire with respect to providing information about such withheld documents while limiting or reducing the amount of time, cost and resources that generating such information may entail. In the litigation context, for example, generating a content-by-example log for use as a privilege log may thus satisfy a producing party's obligation with respect to such a privilege log under the Federal Rules of Civil Procedure, without the time, cost and resource expenditure typically associated with manual preparation.

In any event, once such a content-by-example log for withheld documents is created it can be produced to the requesting party 113 in addition to the disclosed documents 107*a* relevant to the request. The requesting party 113 can then utilize this content-by-example log to, for example, make determinations regarding the withheld documents, including to obtain more information about why the document was withheld (e.g., the claim of privilege), more information on the withheld document, or to actually obtain the withheld document itself.

Figures 1, 1A, 2:
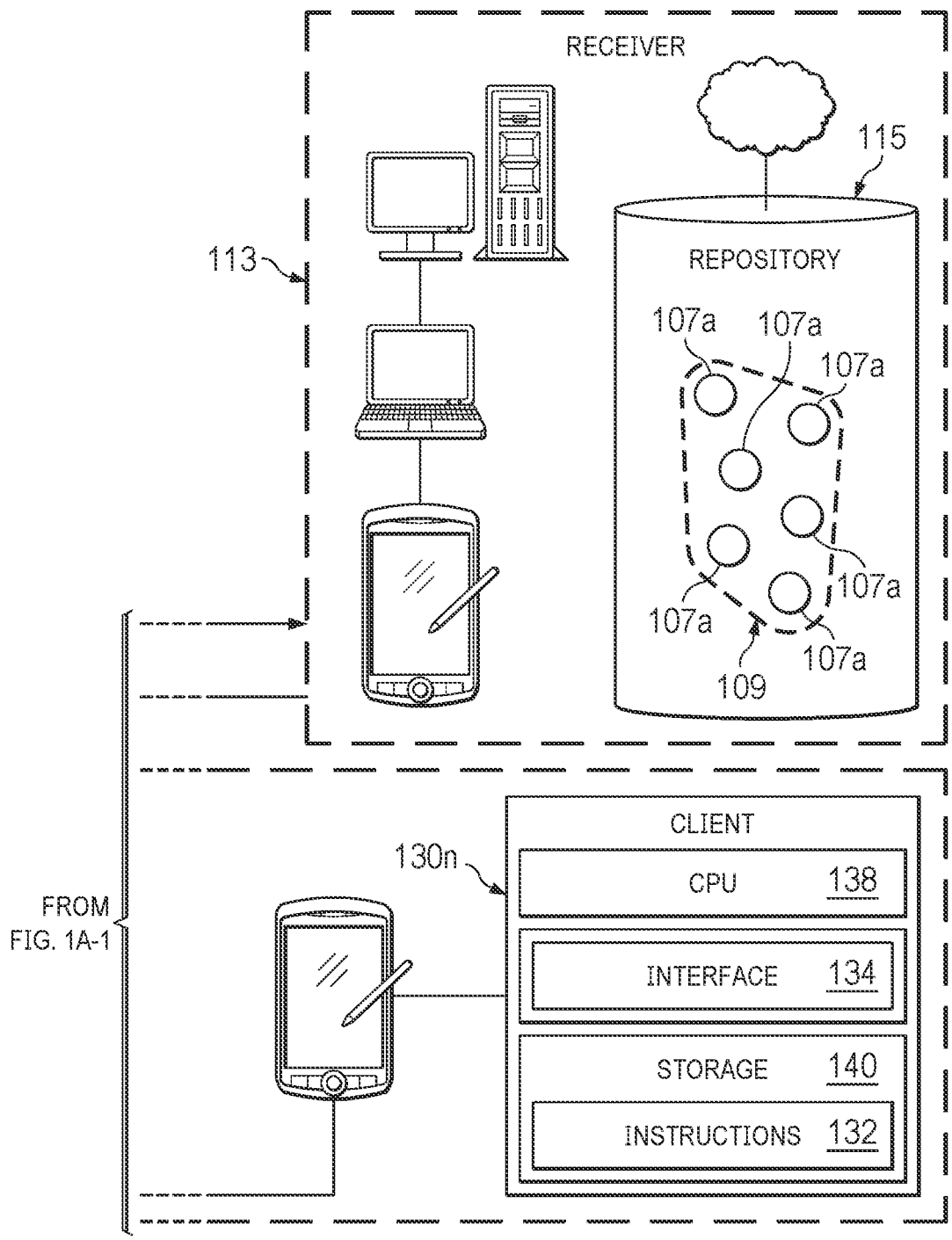

Before describing the analysis and use of such a content-by-example log by a receiving party it may be useful here to describe in more detail embodiments of the generation of a content-by-example log, and provide examples of different types of content-by-example logs. With that in mind, reference is now made to FIG. 2 that depicts one embodiment of a method for producing a content-by-example log in a litigation context. It will be noted here that in such a context, the disclosed documents comprise documents referred to as responsive non-privileged documents while the withheld documents comprise documents referred to as responsive privileged documents, and the content-by-example log produced may be referred to as the privilege-by-example log. Again, the descriptions of embodiments in a context such as litigation are to be taken as examples only without loss of generality and all such descriptions provided in such specific contexts will be understood also to apply generally (e.g., any document described as privileged may be understood as a specific example of a withheld document and non-privileged documents will also be understood as a specific example of a disclosed document without loss of generality.

At step 210 a producing entity may have a corpus 212 of documents (e.g., documents 1-10). At step 220, those documents are separated into a set of documents that are responsive 222 (in this example, documents 1, 2, 3, 4, 5, 7, 9 and 10) and a set of documents that are not responsive 224 (in this example, documents 6 and 8). For example, in a litigation context both sets 222 and 224 may include documents that have been manually reviewed and marked as either responsive or not responsive, or documents that have been so designated by a machine learning algorithm (e.g., such as an artificial intelligence algorithm including classification or the like), or that have otherwise been bulk coded or bulk determined based on some deterministic rule (e.g., if there is an agreement with opposing counsel to produce all the documents in a family of documents that contains at least one responsive document, then the remaining documents in that family are, by the parties' agreement, automatically deemed to be responsive to the request for production), etc.

At step 230, the non-responsive documents (set 224) may be ignored, and the responsive documents (set 222) are further classified (again, whether manually, by machine learning/AI, or deterministically/rule-based) into a privileged set to be withheld 232 (here documents 1, 4 and 5) and a non-privileged set to be disclosed 234 (here documents 2, 3, 7, 9 and 10).

As will be realized, the steps of the methods do not necessarily have to be sequential. For example, here all documents of the corpus (set 212) do not need to be classified into responsive set 222 or non-responsive set 224 in order to begin further classifying some of the responsive documents as either privileged 232 or non-privileged 234. Similarly, it is not unusual to simultaneously classify documents as privileged or non-privileged at the same time that the documents are being classified as responsive or not responsive.

In any event, at some point there are a set of responsive privileged documents and a set of responsive non-privileged documents. Responsive and not privileged documents (set 234) will need to be disclosed (e.g., produced) to opposing counsel. Responsive and privileged documents (set 232) may be withheld and may need to be "logged" on a privilege log (e.g., vital details about the (privilege-based) withheld documents will need to be provided). As discussed, it is important that such privilege logs satisfy the Federal Rules of Civil Procedure. Specifically, they should contain sufficient information about the nature of the documents and communications to give opposing parties the ability to analyze claims of privilege. Moreover, every privilege log should have enough details to withstand scrutiny by the courts.

To generate a privilege log that should meet these obligations for the privileged documents of set 232, at step 240, similarity function 242 is utilized to compare each document of privileged set 232 (e.g., document 1, 4, and 5) with documents of non-privileged set 234 (documents 2, 3, 7, 9 and 10) in order to identify at step 250 the set of documents in non-privileged set 234 (documents 2, 3, 7, 9 and 10) that best represent each document in privileged set 232 (e.g., each of document 1, 4, and 5). This content-by-example log (in this case, a privilege-by-example log) 252 may include a set of identifiers for both the withheld documents, as well as the associated example documents. In particular, this privilege-by-example log may associate an identifier for each withheld privileged document (e.g., 1, 4 and 5) with an identifier for each of the similar (example) documents of the disclosed non-privileged set 234 determined for that particular privileged document. As an example, here withheld privileged document 1 is associated with similar (example) non-privileged disclosed documents 3, 10 and 9. The privilege-by-example log may also be appended with other standard information as is typically used for a privilege log such as metadata and privilege category (e.g., "work product" or "attorney client") for each of the privileged documents (here documents 1, 4, and 5) before it is produced to the receiving party.

In one embodiment, to determine a set of documents from the disclosed non-privileged documents 234 that are similar (e.g., an example document) to a document from the withheld privileged set 232, similarity function 242 may utilize as an input (separately and individually) each withheld responsive, privileged document (aka the "key") from set 232 (e.g., document 1, 4 or 5) and all (or a subset of) the disclosed responsive, not privileged documents from set 234 (e.g., documents 2, 3, 7, 9 and 10). Additionally, the similarity function 242 may utilize user specified parameters 244 pertaining to the similarity function. Those specifications could come from, for example, the producing party, the receiving party, or a negotiation between the two. Similarly function 242 can then be used to compare the withheld privileged document from set 232 against every disclosed document from set 234, and rank or generate a score for the documents of set 234 based on their similarity to the document from set 232 (e.g., the withheld privileged document). By so doing, every withheld privileged document from set 234 will be associated with one or more disclosed documents from set 232 that may be scored or ranked by their similarity to that particular privileged document.

Thus, at step 250, the privilege-by-example log 252 may be assembled by running every document in set 232 through the similarity function 242. That is, every withheld responsive, privileged document in set 232 is used as a "key" and compared to every (or a subset of) disclosed responsive, non-privileged document in set 234. The disclosed documents of set 234 may be ranked or scored by their similarity to that key (e.g., the withheld privileged document of set 232).

Each time another "key" (e.g., a withheld privileged document from set 232) is run through the similarity function 242, an entry may be appended to the privilege-by-example log 252 in the following form, where the first column is a document identifier ("DocID") for the withheld privileged documents from set 232 and the remaining columns are the DocIDs for the most similar non-privileged documents from disclosed non-privileged set 234. The number of determined similar disclosed non-privileged documents of set 234 to include in the privilege-by-example log 252 for an associated withheld privileged document of set 232 may be configurable such that only that number of the (e.g., top ranked or most similar) disclosed non-privileged documents determined for that withheld privileged document may be included in the privilege-by-example log.

| Withheld Docs | Most Similar Disclosed Docs | | | |
|---|---|---|---|---|
| Key DocID #n | DocID#1 | DocID#2 | ... | DocID#k |

If desired, actual score information (e.g., as generated by the similarity function 242) can be included as well. For example:

| Withheld Docs | Most Similar Disclosed Docs | | | |
|---|---|---|---|---|
| Key DocID #n | DocID#1 | DocID#2 | ... | DocID#k |
| | 0.77 | 0.53 | ... | 0.28 |

Thus, a privilege-by-example log may have n rows, where n is the number of documents in the withheld privileged set 232, and k+1 columns, where k is the number of "most similar" DocIDs from disclosed non-privileged set 234 that are included in the privilege-by-example log 252. For example:

| Withheld Docs | Most Similar Disclosed Docs | | | |
|---|---|---|---|---|
| Key DocID #1 | DocID#1 | DocID#2 | ... | DocID#k |
| Key DocID #2 | DocID#1 | DocID#2 | ... | DocID#k |
| ... | ... | ... | ... | ... |
| Key DocID #n | DocID#1 | DocID#2 | ... | DocID#k |

Note that, in the foregoing example, the DocID # for the disclosed documents is a positional index and does not indicate that the same exact disclosed documents are similar to every key DocID. Rather, column 1 of the similar documents ("DocID #1") is the first most similar document to that particular key DocID, column 2 of the similar documents ("DocID #2") is the second most similar to that particular key DocID, etc.

Figure 3:
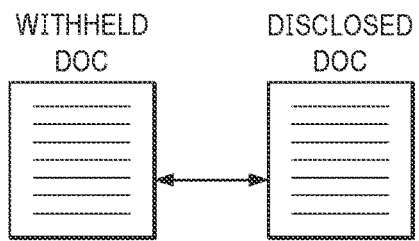
FIG. 3 is a diagram of one embodiment of a method for determining similar documents for a content-by-example log.

While almost any similarity function may be utilized as a similarity function in determining a content-by-example log in certain embodiments, it may be helpful to an understating of particular embodiments to discuss examples of such similarity functions. Looking then at FIG. 3, a depiction of a first similarity function that may be utilized in association with embodiments is to use the entire contents (e.g., text or other content or metadata) of the withheld document (e.g., the privileged document or "key" document being compared) and the entire contents (e.g., text or other content or metadata) from each document from the disclosed set (e.g., non-privileged document) when comparing the two documents. For example, individual words or multi-word phrases extracted from the withheld document and any disclosed document can be used to generate a similarity score between the two documents, or the words or phrases may be transformed into a representation for both documents, and those representations can then be used to generate a similarity score. Those representations may include representations such as feature vectors produced by, for example, Latent Semantic Indexing, Word2Vec, BERT, or another language model, and may be weighted, unweighted, etc. as discussed.

Figure 4:
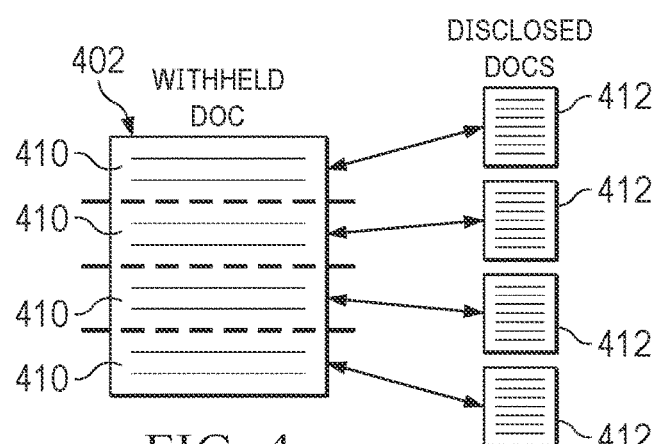
FIG. 4 is a diagram of one embodiment of a method for determining similar documents for a content-by-example log.

Referring now to FIG. 4, another type of similarity function that may be utilized by embodiments is depicted. Here, each key document of the withheld set 402 (e.g., the privileged document) can be broken up into phrases, sections, or passages (selected for any reason, and generally referred to as sections 410) before comparison by the similarity function, and the similarity of documents of the disclosed set 412 (e.g., the non-privileged documents) can be computed independently for each selected section 410. In this case, the form of the content-by-example log (e.g., privilege-by-example log) may include an identification of sections of the key document along with the similar disclosed documents for that section. As an example, a content-by-example log may take the following form where the key document has been broken up into "m" sections:

| Withheld Docs | Most Similar Disclosed Docs | | | |
|---|---|---|---|---|
| Key DocID #n | Section 1 | DocID#1 | DocID#2 | ... DocID#k |
| | Section 2 | DocID#1 | DocID#2 | ... DocID#k |
| | ... | ... | ... | ... ... |
| | Section m | DocID#1 | DocID#2 | ... DocID#k |

In such cases then, an entire content-by-example log may take the following form for key documents 1 though "n", each broken into "m" sections:

| Withheld Docs | Most Similar Disclosed Docs | | | |
|---|---|---|---|---|
| Key DocID #1 | Section 1 | DocID#1 | DocID#2 | ... DocID#k |
| | Section 2 | DocID#1 | DocID#2 | ... DocID#k |
| | ... | ... | ... | ... ... |
| | Section m | DocID#1 | DocID#2 | ... DocID#k |
| Key DocID #2 | Section 1 | DocID#1 | DocID#2 | ... DocID#k |
| | Section 2 | DocID#1 | DocID#2 | ... DocID#k |
| | ... | ... | ... | ... ... |
| | Section m | DocID#1 | DocID#2 | ... DocID#k |
| ... | Section 1 | DocID#1 | DocID#2 | ... DocID#k |
| | Section 2 | DocID#1 | DocID#2 | ... DocID#k |
| | ... | ... | ... | ... ... |
| | Section m | DocID#1 | DocID#2 | ... DocID#k |
| Key DocID #n | Section 1 | DocID#1 | DocID#2 | ... DocID#k |
| | Section 2 | DocID#1 | DocID#2 | ... DocID#k |
| | ... | ... | ... | ... ... |
| | Section m | DocID#1 | DocID#2 | ... DocID#k |

Figure 5:
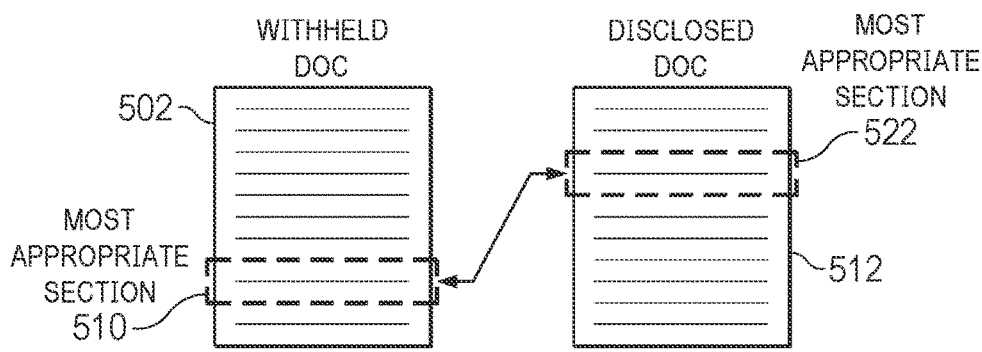
FIG. 5 is a diagram of one embodiment of a method for determining similar documents for a content-by-example log.

FIG. 5 depicts another type of similarity function that may be utilized in embodiments. In this example, a similarity function could use documents that are either tagged as responsive, privileged, or for any issue desired, build a statistical (machine learned) model based on those tags, and then and use that model to predict the most appropriate (relative to that model) section 510, 522 within either or both of the withheld (privileged) document 502 and each similarity candidate disclosed (non-privileged) document 512. Then, instead of computing similarity based on entire documents, similarity could be computed between the most appropriate passage(s) 510, 522 only. In other words, in this instance of a similarity function, a section 510 from the withheld (privileged) document 502 that is most appropriate (responsive, privileged, issues, etc.) with respect to a request by the receiving party may be determined, and a section 522 of each candidate disclosed (non-privileged) document 512 that is most appropriate to the request may also be determined. These most appropriate sections 510 of the key withheld (privileged) document and 522 determined for a candidate disclosed (non-privileged) document 512 can then be compared to generate the similarity score between those two documents 502, 512. In this manner, just these sections can be compared to generate the similarity score, instead of a comparison of the entire contents of the documents 502, 512.

Figure 6:
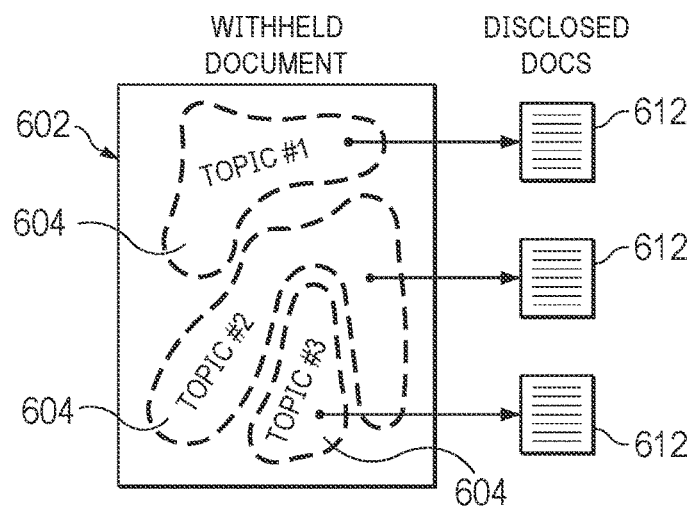
FIG. 6 is a diagram of one embodiment of a method for determining similar documents for a content-by-example log.

Topical clustering may also be performed in association with the similarity function in certain cases. FIG. 6 depicts one embodiment of a similarity function employing such topical clustering. Specifically, in certain similarity functions that may be utilized with embodiments, topical clustering may be performed on a key withheld (privileged) document. Similarities can then be determined between these topic clusters and each candidate disclosed (non-privileged) document to determine the disclosed (non-privileged) documents with the highest similarities to each of those topics. In some cases, the topics can then be extracted from each cluster determined from the key document and these extracted topics may be utilized for this comparison.

To illustrate, the key withheld (privileged) document 602 may be segmented or otherwise clustered into a number of topical regions 604. For example, some parts of the key withheld (privileged document) 602 might be describing giraffe habitats, other parts of the key withheld (privileged document) 602 might be describing wildlife conservation techniques, and other parts of the key withheld (privileged document) 602 might be describing funding issues. These different topics are not necessarily contiguous within the document 602 itself. Accordingly, sentences, paragraphs, keywords, or phrases (collectively sections) in the document 602 could first be clustered into different topical clusters 604. A similarity can then be computed between each cluster 604 and the candidate disclosed (non-privileged) documents 612. In some cases, topic extraction may be performed to generate a topic (e.g., a phrase, set of keywords, feature vector, etc.) representing any given cluster 604, and this extracted topic may be utilized for such a comparison. A content-by-example (privilege) log created according to such a similarity function may take a form similar to that given in the description provided with respect to FIG. 4 above.

It should be noted that the examples of similarity functions given above are provided by way of example and that other similarity functions may be utilized with various embodiments, and that the disclosed similarity functions or others not specifically disclosed may be utilized independently or together (e.g., mixed or matched) as desired. For example, an embodiment may perform conceptual clustering of the sentences in a key withheld document, and then calculate similarity for each resulting cluster to the most appropriate passage in each document in the disclosed set of documents to find similar documents for the key withheld document.

Moreover, as will be understood after reading the disclosure, the keywords, phrases or feature vectors used to compare two documents (or document sections), may also be weighted in association with such similarity functions. For example, one similarity function is to sum the number of features in common. So, take these three sentences:

Sentence 1: The fox and the hound run fast
Sentence 2: The The was a fantastic early 90s music band
Sentence 3: My fox likes to run Sentence 1 and sentence 2 have two words in common (the word "the", twice in both documents). Thus, the similarity score for those two sentences could be 1.0+1.0=2.0. Similarly, sentence 1 and sentence 3 have two words in common ("fox" and "run"). Again, the similarity score for those two sentences could be 1.0+1.0=2.0. Accordingly, under a naive similarity metric, (e.g., giving all words a weight of 1.0), sentence 1 is just as close to sentence 2 as it is to sentence 3. They have the same similarity score.

To enhance the assessment of similarity, a weighting scheme, such as inverse document frequency (IDF) may be utilized to weight the common terms. For example, one basic form of OF is 1/n, where n is the number of times a word or phrase appears in a collection of documents (or sentences in this example). So, suppose that the word "the" appears 506 times in the collection, the word "fox" appears 48 times, and the word "run" appears 117 times. Here, the similarity score between sentence 1 and sentence 2 would be the sum of the two OF weights for the word "the"=1/506+1/506=0.004. The similarity score between sentence 1 and sentence 3 would be the sum of the OF weight for "fox" and the OF weight for "run"=1/48+1/117=0.029, and since 0.029 is larger than 0.004, that means that sentence 1 is more similar to sentence 3 than it is to sentence 2. This is the case even though they share the exact same number of words in common. Thus, weighting may be employed with similarity functions as utilized herein to obtain even better results in the comparison of withheld documents to disclosed documents.

However, even better results may be achieved by certain embodiments by utilizing weighting in a similarity function in a "supervised" manner, by using data associated with each of the documents. To describe in more detail, it may be the case that document similarity is generated using weights determined in an unsupervised manner, meaning that the weights are determined without regard to any labeling of the documents (e.g., as belonging to some class or category) such as relevance or privilege. These unsupervised weights are usually derived from general statistics associated with the corpus, like TF (frequent words in a document represent that document) and IDF (which reflects that words that are less common in the collection typically have more "meaning" associated with them). As an example, "the" is a very common term and doesn't carry a lot of semantic content while "herringbone flooring" is a much less common term and therefore carries a lot of semantic content. Generally then, two documents with the term "herringbone flooring" in them are typically much more similar than two documents with the term "the" in them.

However, in many contexts where embodiments as disclosed are utilized there may indeed be characteristic information associated with the documents whose similarity is being calculated, in addition to just the text of the documents. For example, documents may have been denoted as responsive (e.g., to a discovery request) or as privileged documents, or as both. In other words, there may be some documents that, by virtue of information about the document beyond just the text, are known to be more pertinent to a topic of interest, or about which more is generally known (e.g., the document is relevant/non-relevant to a request, privileged/non-privileged, etc.) than a random document.

In such embodiments, the weighting schemes employed by similarity functions for document similarity calculations are often based on weights determined while classifying or categorizing documents (e.g., separating responsive from non-responsive documents, or privileged from non-privileged documents). To illustrate, suppose two different words are equally frequent in the corpus of documents (e.g., both are found in 485 documents). But further assume word #1 is found in 412 responsive documents and 73 non-responsive documents, while word #2 is found in 107 responsive and 378 non-responsive documents. Clearly word #1 is more pertinent to the topic of interest than word #2. Those skilled in the art will recognize these words as "features" used to characterize the documents, and further that words are just one example of the features of a document. So, a weighting scheme may be employed by a similarity function that uses weights based on criteria such as responsive-to-nonresponsive feature ratios, or based on weights derived from a supervised machine learning model (e.g., logistic regression, support vector machines, naive bayes, etc.) that is trained using positive and negative class labels.

Thus, by using weights derived from the data associated with the documents (e.g., labels such as responsive or nonresponsive), or from supervised models built from those documents, the similarity between two documents will be more heavily influenced by the specific features of a document (e.g., words, phrases, etc.) that more generally reflect context (e.g., the substance of a discovery request). These similarity functions may thus generate similarity scores that are more reflective of the actual document similarity, from a contextual standpoint. Thus, according to embodiments, feature weights inside of similarity functions can be based not only on corpus statistics or other unsupervised weighting schemes, but may also be based on supervised techniques (weights derived from supervised models) or other class-specific statistics (e.g., using IDF, but only on the responsive subpopulation rather than on the collection as a whole).

Regardless of the specific similarity function utilized, once such a content-by-example log for withheld documents is created, it can be produced to the requesting party in addition to the disclosed documents responsive to the request. The requesting party may, however, wish to obtain additional information on the withheld documents, or dispute or challenge the withholding of particular documents. In the litigation context, for example, a receiving party may wish to obtain more information about the claim of privilege or more information on the withheld document, or to challenge claims of privilege to actually obtain the withheld document itself. But, similar to the creation of the privilege log, the determination of which, if any, withheld documents should be further assessed or challenged with respect to a claim of privilege by the producing party can entail a significant amount of resources and cost by the receiving party. This situation arises because the burden of identifying such documents and making such challenges falls almost entirely on the requesting party.

Accordingly, the information provided in any given content-by-example log for every withheld document may need to be analyzed by an entity receiving the content-by-example (e.g., privilege-by-example) log to determine which documents should be challenged. This analysis may take into account a myriad of factors, given the real-world desire to limit the number of challenges to privilege (e.g., an attorney may not wish to spend the money or resources, or risk the ire of a judge, by issuing too many challenges), along with the dual inquiries of (1) whether enough is known about the full scope of possible topics that appear to be covered in the (incorrectly-marked as) privileged documents (referred to as coverage) and (2) whether enough is known about the specific substance of topics in the privileged documents that really matter to the litigation (e.g., the topics determined to be important or "hot"—referred to focus).

Stated another way, a requesting party may desire to determine which withheld (e.g., privileged) documents will add to, or supplement, that party's knowledge the most, relative to what information can be gleaned from documents that have been disclosed, so the requesting party can prioritize which withheld (e.g., privileged) documents should be challenged. Moreover, it may be incumbent on such a challenging entity to show that the producing party improperly withheld the (e.g., purportedly privileged) documents.

To those purposes, among others, embodiments of document analysis systems and methods further disclosed herein may be utilized to analyze a content-by-example log that identifies a first set of documents to which an entity may not have access, and a list of associated example documents similar to each identified document of the first set, where each of the identified example documents is from a second set of documents to which the entity does have access. In particular, embodiments may analyze a content-by-example log to determine a number of documents of the first set (e.g., withheld documents) on which an entity may wish to obtain more information or take action (e.g., challenge), or that may more generally be of greater interest to the entity, relative to the other withheld documents identified in the content-by-example log (collectively, all considered to be documents of "greater interest").

To determine which of the withheld documents identified in such a content-by-example log may be of greater interest, embodiments of a document analysis system may create a feature vector for each of the withheld documents identified in the content-by-example log (and representing that withheld document) based on the text or any additional characteristic information for every example document associated with that withheld document in the content-by-example log. This feature vector may be generated by utilizing various information associated with the example documents as features, such as (1) using just the document identifiers (DocIDs) for example documents as features, or (2) utilizing weighted terms, phrases, or sections of the example document as the features. The feature vectors for each withheld document can then be associated with the withheld document to form a feature vector index (e.g., an index of identifiers for each withheld document, associated directly or indirectly with the feature vector that was generated for that withheld document based on the associated example disclosed documents in the content-by-example log). Using this feature vector index then, information retrieval techniques may be utilized to identify which of the withheld documents may be of greater interest based on the associated feature vectors. Such a determination may be repeated as desired by the entity utilizing the document analysis system. The entity that received the content-by-example log can then choose to take some action with respect to the set of withheld documents that may be of greater interest, such as challenging the withholding of the documents (e.g., requesting production of such withheld documents) or requesting more information on why such documents were withheld.

Figures 1, 1B:
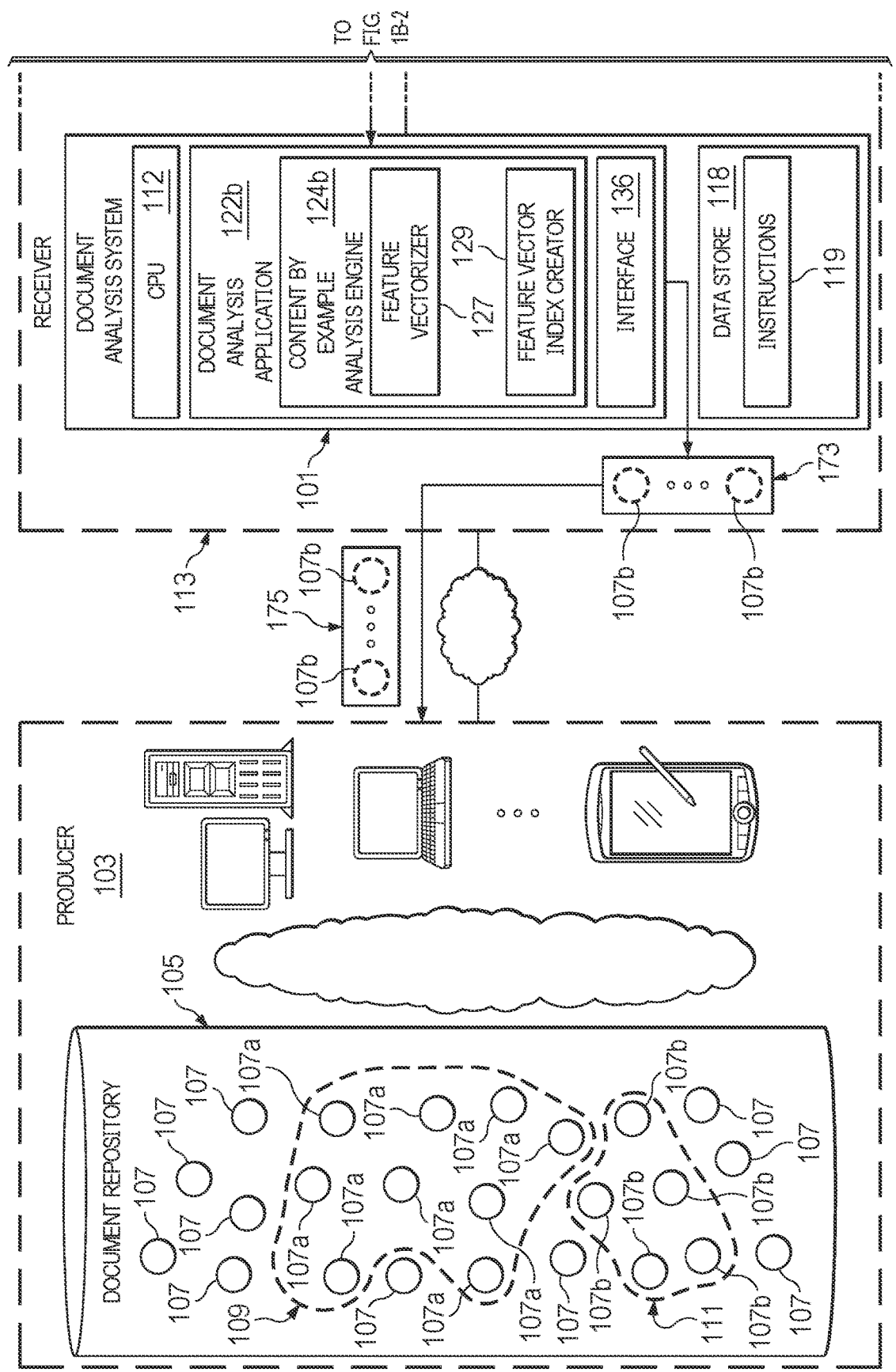
Figures 1, 1B, 2:
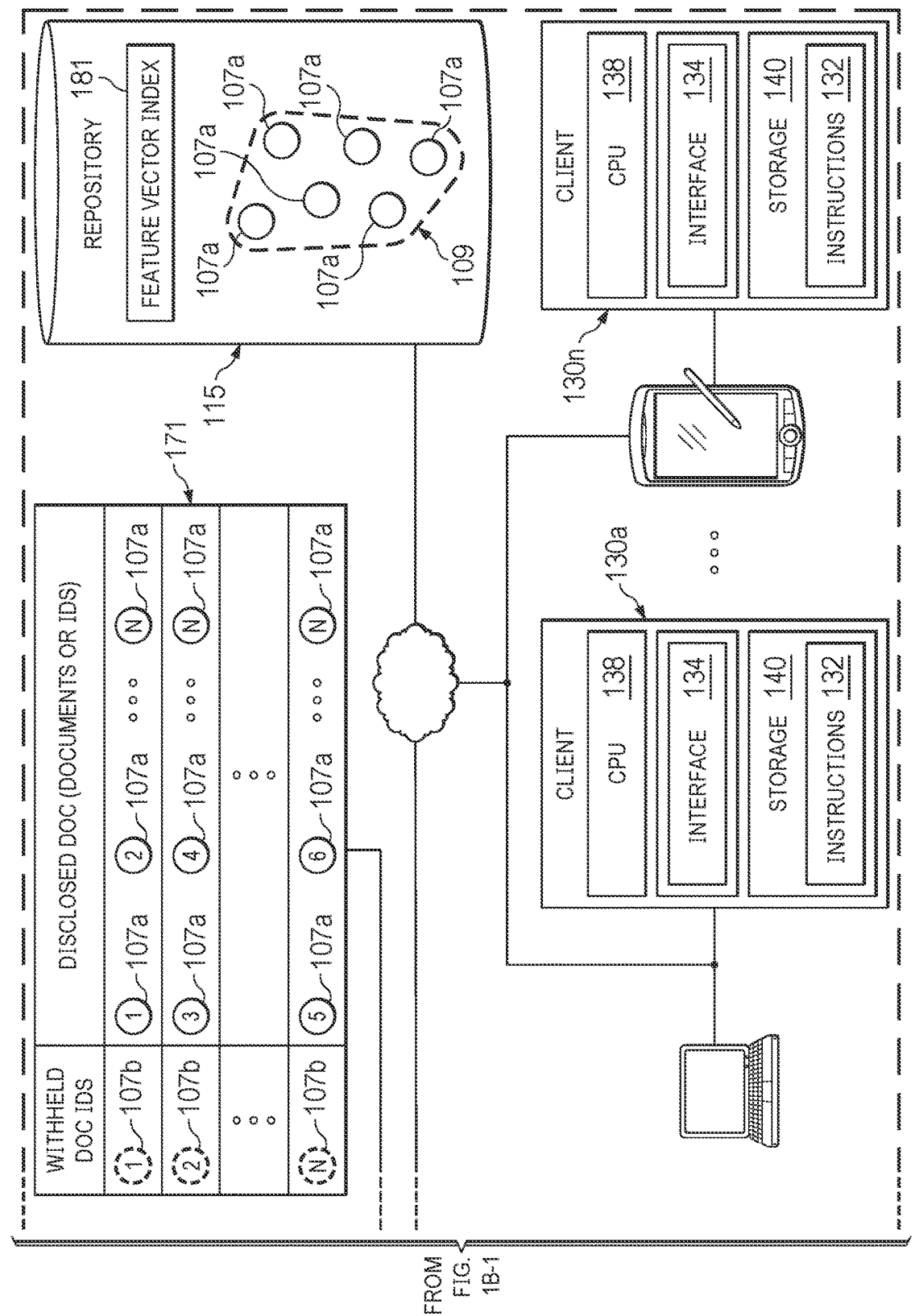
Figure 2:
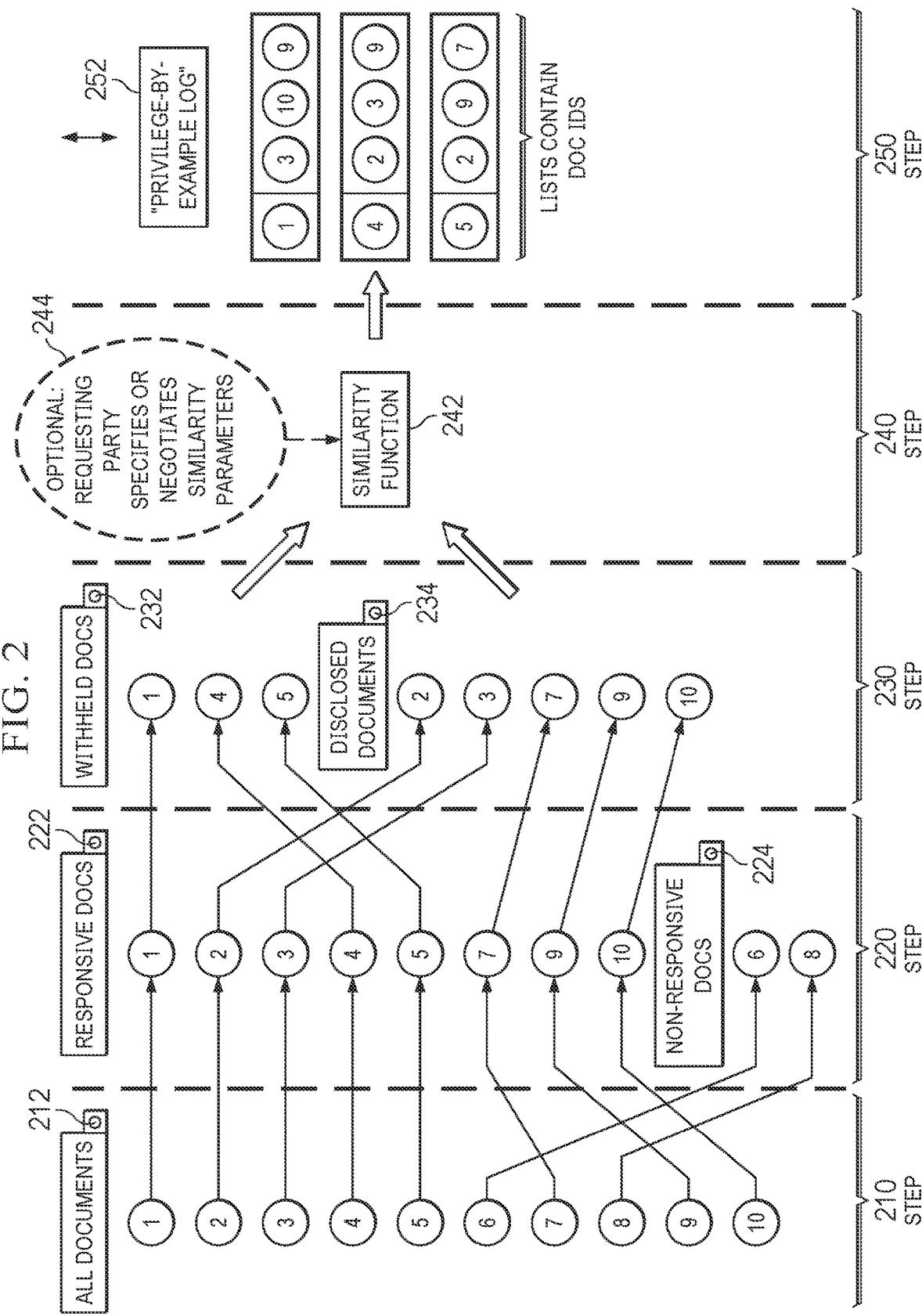

Referring now to FIG. 1B, a block diagram of one embodiment of a document analysis system that analyzes a content-by-example log is depicted. The document analysis system 101 is part of a computing environment of a receiver party 113 that includes one or more repositories 115 and one or more client computers 130a, 130n. As discussed, a content-by-example log 171 may be provided to the receiver 113 (e.g., by a producing party 103), where the content-by-example log 171 may include identifiers for documents 107b withheld from the receiver 113 (but which may still be of interest to the receiver 113) in terms of disclosed documents 107a to which the receiver 113 has access. Thus, in some cases, the set 109 of disclosed documents 107a are stored (e.g., in a repository 115 associated with the receiver 113) or otherwise accessible by the receiver 113.

Again, document analysis system 101 may include one or more (virtual or physical) servers or other type of computing device utilizing a central processing unit 112 connected to a memory and a data store 118 (e.g., via a bus). Central processing unit 112 may represent a single processor, multiple processors, a processor(s) with multiple processing cores and the like. Data store 118 stores computer executable instructions 119. Computer executable instructions 119 can represent one or more multiple programs or operating system instructions. In one embodiment, instructions 119 are executable to provide document analysis application 122b.

Client computer systems 130 may include components similar to those of the server of document analysis system 101, such as CPU 138 and data store 140. Additionally, client computer system 130 may include executable instructions 132 to provide user interface 134 that allows a user to interact with document analysis system 101 to analyze a content-by-example log for documents 107 comprising the corpus. These instructions 132 may have, for example, been provided by document analysis system 101 in response to an access by client computer 130. For example, user interface 134 may be provided through a web browser, file system interface or other method, without loss of generality. Moreover, user interface 134 may interact (e.g., issue requests, receive responses, etc.) with a corresponding interface 136 of the document analysis application 122b, which may be, for example a web services interface, an Application Programming Interface (API) or another type of interface.

The document analysis system 101 may provide content-by-example log analysis capabilities to users through document analysis application 122b (e.g., through interface 134). Specifically, content-by-example log 171 may be provided to the receiver 113 (e.g., by a producing party 103), where the content-by-example log 171 may include identifiers for documents 107b withheld from the receiver 113 (but which may still be of interest to the receiver 113) in terms of disclosed documents 107a to which the receiver 113 has access. A user may effect analysis of such a content-by-example log 171 to determine a set 173 of withheld documents 107b (e.g., identifiers for those withheld documents) that may be of interest to the user or the receiving party 113 more generally. The receiving party 113 or user may then select a set 175 of one or more of these identified withheld documents 107b to challenge the withholding of the documents (e.g., requesting production of certain withheld documents) or for which to request more information.

The task of determining which withheld documents may be of particular interest to a receiver, while having access only to such a content-by-example log 171 (and in the absence of access to the actual withheld documents themselves), is a non-trivial task. Typically, an analysis associated with particular documents necessitates access to those documents, as those documents are represented and analyzed based on the content in the documents themselves (e.g., words, phrases, numbers, etc.) or on transformations of the content included in the document (e.g., the part of speech of a word, or the sentiment of a phrase, or some sort of dimensionality reduction—such as latent semantic analysis or Word2Vec—of an entire vocabulary of words or phrases).

When determining which withheld documents 107b identified in a content-by-example log 171 may be of interest, however, the receiver 113 does not have access to those documents 107b. Instead, receiver 113 may only have access to a set of disclosed documents 107a associated with each withheld document 107b in the content-by-example log 171 along with any other information included in the content-by-example log 171 such as a ranking of the disclosed documents 107a with respect to an associated withheld document 107b or similarity scores disclosed documents 107a with respect to an associated withheld document 107b.

Content-by-example analysis engine 124b may thus be adapted to identify withheld documents 107b (identified in content-by-example log 171) that may be of interest, without having access to those withheld documents 107b, by using the disclosed documents 107a identified as associated with each withheld document 107b. Content-by-example analysis engine 124b may perform such a determination by determining a feature vector for each withheld document 107b identified in the content-by-example log 171 and, in turn, creating a feature vector index 181 comprising the feature vector for each withheld document 107b. The content-by-example analysis engine 124b can then perform information retrieval, clustering (e.g., unsupervised machine learning), or ranking or predicting (e.g., supervised machine learning) on the identified withheld documents 107b based on the feature vector associated with each of the withheld documents 107b in the feature vector index 181 to, for example, determine which withheld documents 107b may be of greatest interest.

In a particular embodiment then, content-by-example analysis engine 124b may include a feature vectorizer 127 adapted to create a feature vector for an identified withheld document 107b based on the similar disclosed documents 107a for that withheld document 107b identified in the content-by-example log 171 (or more generally, to transform a content-by-example log 171 into one or more feature vectors associated with the withheld documents 107b identified therein using the associated similar documents 107a). Specifically, this feature vectorizer 127 may employ a weighting mechanism to create such a feature vector for a withheld document 107b.

It may be useful here to describe weighting as utilized by embodiments in more detail. As discussed, a weighting function may be utilized by the feature vectorizer 127 when transforming a content-by-example log 171 into a feature vector. This weighting function may be used to assign weights to each feature in such a feature vector.

It will be recalled from the above discussion that a content-by-example log 171 includes a document identifier (also referred to as a DocID) for a withheld document (e.g., "Priv_1" for a first withheld document, "Priv_2" for a second withheld document, etc.) followed by some number of identifiers (DocIDs) for disclosed documents 107a (e.g., "id_104" for a first disclosed document, "id_122" for a second disclosed document, etc.). These disclosed documents 107a (e.g., the DocIDs for the disclosed documents 107a) for a withheld document 107b may be, for example, unordered, ordered (e.g., ranked, but with no score), or similarity ordered (ranked by the score). The set of DocIDs for disclosed documents 107a for a withheld document 107b may be referred to as a content example vector for that withheld document 107a. The diagram above below shows an example of a similarity ordered content-by-example (privilege-by-example) log:

| Withheld Docs | Most Similar Disclosed Docs | | | |
|---|---|---|---|---|
| Priv_1 | id_104 | id_122 | ... | id_113 |
|  | 0.77 | 0.53 | ... | 0.14 |
| Priv_2 | id_122 | id_103 | ... | id_114 |
|  | 0.05 | 0.02 | ... | 0.001 |
| Priv_3 | id_107 | id_104 | ... | id_122 |
|  | 0.9 | 0.8 | ... | 0.45 |
| ... | ... | ... | ... | ... |
|  | ... | ... | ... | ... |
| Priv_10431 | id_100 | id_104 | ... | id_105 |
|  | 0.87 | 0.82 | ... | 0.81 |
| Priv_10432 | id_108 | id_133 | ... | id_104 |
|  | 0.98 | 0.97 | ... | 0.96 |

The weighting function of feature vectorizer 127 may reduce such a content-by-example log 171 to a feature vector using a weighting scheme that may be tailored to the format or type of content-by-example log 171. One type of weighting function that may be employed is a uniform weighting function. If the content-by-example log 171 is given in terms of disclosed DocIDs, but with neither scores nor ordering (ranks), weights may be given uniformly. That is, the weights can either be 1.0 for every DocID, or 1/k, where k is the number of disclosed DocIDs in a content-by-example log 171 associated with a given withheld document 107b.

If the content-by-example log 171 includes ranked disclosed DocIDs, but with no (similarity) scores, weights may be given as a function of such a ranking. Here, the weights can be, for example, 1/n or 1/log(n), etc., where n is the rank of the document from 1 ... k and k is the length of the ranking, and k is the number of disclosed DocIDs in the content-by-example log 171 associated with a given withheld document 107b. Such an approach has the effect of weighting higher-ranked documents greater than lower-ranked documents.

If the content-by-example log 171 includes DocIDs and similarity scores for those DocIDs, where those similarity scores are attributable to the relationship between the withheld document 107b and each associated disclosed document 107a, then the weighting function may generate weights that account for these similarity scores. That could be accomplished using either the raw score, the normalized score, or some other analogous function. Thus, when similarity scores are provided, feature vectorizer 127 may employ a score-based weighting function (as described) in generating a feature vector for withheld documents 107b identified in the content-by-example log 171.

To create such a feature vector, in one embodiment, feature vectorizer 127 may utilize every one (or a subset) of document identifiers for disclosed documents in the content-by-example log 171 as a feature that represents the withheld document 107b to which it is similar. Withheld documents 107b may then be indexed according to the disclosed document features (the selected identifiers) by feature vector index creator 129 to create feature vector index 181.

For example, imagine the following content-by-example log entry for the withheld document Priv_1:

| Withheld Docs | Most Similar Disclosed Docs | | |
|---|---|---|---|
| Priv_1 | id_104 | id_122 | id_113 |
|  | 0.77 | 0.53 | 0.14 |

The three features that represent this Priv_1 document are "id_104", "id_122", and "id_113", which may be weighted (as described) by their score, their rank, or uniformly. Thus, a feature vector for a withheld document 107b in the feature vector index 181 may include document identifiers for the similar documents 107a where those document identifiers for the similar documents 107a may be weighted in some manner.

In another embodiment, feature vectorizer 127 may utilize the actual content (e.g., or metadata) of the similar document 107a identified for a withheld document 107b to determine features to associate with the withheld document 107b. These features can be, for example, weighted terms, phrases, or other text-based features (e.g., word vectors, named entities, sentiment, etc.) determined from the content of the similar disclosed documents 107a. The feature vector index creator 129 can then form feature vector index 181 by replacing document identifiers of similar disclosed documents 107a for a withheld document 107b in the content-by-example log 171 with the weighted set of text-based features derived from the content of the similar document 107a represented by that DocID. This is possible, again, because all similar documents 107a are available to receiver 113 as disclosed documents, in addition to being referenced by the document identifiers of the similar documents 107a in the content-by-example log 171 that make up each withheld document's content example vector (e.g., the set of similar documents 107a associated with the identifier for the withheld document 107b). Therefore, receiver 113 may further process and extract any kind of feature from the content of those similar documents 107*a*.

Feature vectorizer 127 may also weight the determined features for a withheld document 107*b* based on similarity scores from the content-by-example log 171. Specifically, the feature vectorizer 127 may utilize the similarity score between an identified withheld document 107*b* and a similar document 107*a* identified in the content example vector for that withheld document 107*b* to weight features determined from that similar document 107*a* for that withheld document 107*b*. For example, when a document identifier for a similar document 107*a* in the content example vector for a withheld document 107*b* is replaced or expanded by a document feature vector, the features in that document feature vector can be further weighted by the overall document similarity score (e.g., the similarity score for a similar document 107*a* from which the feature was derived). For example, suppose a content-by-example log includes the following entry for the withheld document Priv_1:

| Privileged Docs | Most Similar Produced Docs | | |
|---|---|---|---|
| Priv_1 | id_104 | id_122 | id_113 |
|  | 0.77 | 0.53 | 0.14 |

Imagine further that the (e.g., text) feature vectors determined from similar documents id_104, id_122, and id_113 are:

| id_104 | cat | dog | pet |
|---|---|---|---|
|  | 1.0 | 1.0 | 1.0 |
| id_122 | cat | feline |  |
|  | 1.0 | 1.0 |  |
| id_133 | feline | whiskers |  |
|  | 1.0 | 1.0 |  |

If feature vectorizer 127 weights the terms in each feature vector for each similar document by their DocID's content-by-example log similarity score, it may produce the following scores for feature vectors associated with the similar documents for Priv_1:

|  | Rank 1 | Rank 2 | Rank 3 |
|---|---|---|---|
| id_104 | cat | dog | pet |
|  | 0.77 | 0.77 | 0.77 |
| id_122 | cat | feline |  |
|  | 0.53 | 0.53 |  |
| id_133 | feline | whiskers |  |
|  | 0.14 | 0.14 |  |

Feature vectorizer 127 can then replace the DocID features in the original content example vector for the withheld document in the content-by-example log 171 (or a copy thereof) with the (e.g., text) feature vectors determined from the respective similar documents of the content example vector, which yields:

| Priv_1 | cat | cat | dog | pet | feline | feline | whiskers |
|---|---|---|---|---|---|---|---|
|  | 0.77 | 0.53 | 0.77 | 0.77 | 0.53 | 0.14 | 0.14 |

Notice here that there are duplicate entries in this feature vector (e.g., both "cat" and "feline" appear twice). When such a situation occurs feature vectorizer 127 may combine the weights for this feature in some manner to create a single entry in the feature vector for that feature (e.g., by averaging, summing, or some other combination of the weights for that feature).

Assuming for sake of example that combination of the features is accomplished by summing the feature weights for the same feature, the withheld document Priv_1 may now be represented by the following feature vector, where (e.g., text) features determined from the similar disclosed documents 107*a* from the content example vector for Priv_1 have replaced the original disclosed DocID features included in the content example vector.

| Priv_1 | cat | dog | pet | feline | whiskers |
|---|---|---|---|---|---|
|  | 1.3 | 0.77 | 0.77 | 0.67 | 0.14 |

Note that the feature vector determined for a withheld document 107*b* by feature vectorizer 127 based on the similar documents 107*a* for the withheld document 107*b* in the content-by-example log 171 is likely to not be the same feature vector that would be created if receiver 113 had access to the actual withheld document 107*b* and was able to perform feature extraction on that withheld document 107*b* directly.

Namely, there will be terms in the withheld document 107*b* (e.g., "Priv_1" in the above example) that are not found in the determined feature vector, and terms in the determined feature vector that are not found in the withheld document 107*b* (e.g., again "Priv_1" in the above example). That is because documents specified in the content example vector for the withheld document 107*b* (e.g., the documents id_104, id_122, and id_133 for "Priv_1" in the above example) are not the same exact documents as the withheld document 107*b*, but are rather disclosed documents 107*a* deemed to be similar to that withheld document 107*b*. But beneficially, such a feature vector can serve as a useful representation for the withheld document 107*b* in the absence of the withheld document 107*b* itself, and is useful for determining withheld documents 107*b* that may be of greater interest to receiver 113 (e.g., relative to other withheld documents 107*b* in the content-by-example log 171).

It will be noted here that similar replacement can be done with any other feature vector that the receiver 113 wishes to extract from the similar documents 107*a* specified in the content example vector for a withheld document 107*b*. Feature vectors may even be extracted that were not used in the original construction of the content-by-example log 171. For example, the content-by-example log 171 might have been constructed using "bag of words" tokens to find similar documents 107*a* for use in content-by-example vectors, whereas the receiver 113 may desire to convert the disclosed documents 107*a* into longer phrases or sentences, or into some sort of latent semantic space such as latent semantic analysis (LSA) or Word2Vec.

The receiver 113 might also extract other features from the disclosed (e.g., non-privileged) documents 107*a*, such as document date, email communication values (to/from), file paths, file types, image pixel data, etc. and add those to the feature vector for a withheld document 107*b*. Thus, it is important to note here that even though embodiments have been described as creating a feature vector for a withheld document 107*b* that is based on features derived for similar documents 107*a* and specified for that withheld document 107*b* in the content-by-example log 171, and using such only that feature vector in feature vector index 181, embodiments may also utilize other (e.g., additional) features in the feature vectors included in feature vector index 181. These other features may include metadata of similar documents 107a of a withheld document 107b, such as file type, file date, custodian (document owner), people involved in a communication, etc. such that a withheld document's feature vector can include such information as well, and these additional features can be utilized in determining withheld documents of interest.

In another embodiment, feature vectorizer 127 and feature vector index creator 129 may utilize a staged approach to determine feature vectors to associate with the withheld documents 107b and create feature vector index 181. In the single stage approach described above, in both embodiments of generating a feature vector to be included in a feature vector index 181 for each withheld document 107b (e.g., direct use of similar documents 107a as features or replacing the document identifiers of the similar documents 107a with features determined from those similar documents 107a) the feature vector for a withheld document may be directly associated with that withheld document 107b. Whether that vector consists of similar document identifiers, or of text, or other extracted, features, the features in those vectors are the ones that may be associated directly with the withheld document 107b and utilized to determine withheld documents of interest.

In certain embodiments, however, a two stage index may be employed such that feature vector index 181 may include two distinct indices or comprise separate sets of feature vectors: one feature vector index comprising feature vectors associated with each withheld document of the content-by-example log 171 and a second feature vector index comprising features associated with each similar document 107a such that, for example, features from the first index, including feature vectors associated with similar documents 107a, may be used as keys for the second index, or similar document identifiers of the second index may be used as a key for the second index.

Accordingly, in one embodiment, in a first index of feature vector index 181 the feature vectors may be substantially similar to that described above where the features for an identified withheld document 107b are the identifiers (e.g., and score or ranking) for the similar disclosed documents 107a identified for that withheld document 107b in content-by-example log 171 (this index may be referred to as the content-by-example index):

| Withheld Docs | Most Similar Disclosed Docs | | | |
|---|---|---|---|---|
| Priv_1 | id_104 0.77 | id_122 0.53 | ... | id_113 0.14 |
| Priv_2 | id_122 0.05 | id_103 0.02 | ... | id_114 0.001 |
| Priv_3 | id_107 0.9 | id_104 0.8 | ... | id_122 0.45 |
| ... | ... | ... | ... | ... |
| ... | ... | ... | ... | ... |
| Priv_10431 | id_100 0.87 | id_104 0.82 | ... | id_105 0.81 |
| Priv_10432 | id_108 0.98 | id_133 0.97 | ... | id_104 0.96 |

The second index of the feature vector index 181 may comprise features associated with each disclosed document 107a referenced in the content-by-example log 171 that have been extracted from that (similar) disclosed document 107a and may also include weightings associated with that feature (e.g., relative to the associated similar document 107a). Such an index may be referred to as a disclosed document index. These features can comprise, for example, weighted terms, phrases, or other (e.g., text-based) features such as word vectors, named entities, sentiment, etc., determined from the content of the disclosed documents 107a.

| | Rank 1 | Rank 2 | Rank 3 |
|---|---|---|---|
| id_104 | cat 1.0 | dog 1.0 | pet 1.0 |
| id_122 | cat 1.0 | feline 1.0 | |
| id_133 | feline 1.0 | whiskers 1.0 | |

The two indices of such a two-stage feature vector index 181 can then be used in tandem to perform determination of withheld documents 107b of interest. Specifically, operations can be performed on the second index (such as a search) based on term features of interest to determine identifiers for similar documents while subsequent operations (e.g., another search) can use these similar document identifiers in association with the first index to determined identifiers for withheld documents 107b (e.g., of withheld documents 107b of interest).

For example, referring to the example indices above, suppose the user wishes to do a search for documents likely to be privileged in a litigation, and wishes to search using words that they feel are indicative of privileged information, rather than search using identifiers for non-privileged documents. Such a search could be accomplished in the following manner (here, by way of example, the first stage will be described as a Boolean query and the second stage as a TF.IDF query, though almost any search techniques desired could be utilized. In this example, in a first stage, a user may enter the Boolean query "((cat OR whiskers) AND NOT dog)". This search would retrieve the documents id_122 and id_133 from the disclosed document index. It would not retrieve document id_104. In the second stage, a TF.IDF query "(id_122 id_133)" is created. This retrieves the documents (e.g., DocIDs) Priv_1, Priv_2, Priv_3, and Priv_10432 from the content-by-example index of the feature vector index 181 and ranks them by the TF.IDF score.

As another example, different techniques may be utilized with each index of the feature vector index 181. In this example, clustering (unsupervised learning) in one stage may be combined with information retrieval in another stage to determine withheld documents 107b of interest. Accordingly, in a first stage, a clustering algorithm may be applied to the disclosed document index, clustering document identifiers for disclosed documents 107a by the terms (included in the disclosed document index) in those documents. A cluster centroid document identifier (e.g., id_104 for the kth cluster) may be chosen as a representative example of each cluster. In the next stage, each cluster centroid document identifier (e.g., id_104) can be used to retrieve one or more (e.g., most) representative withheld document identifiers using the content-by-example log 171.

Thus, in certain embodiments the feature vectorizer 127 and feature vector index creator 129 may either collapse the disclosed document index into the content-by-example index to create a single index or may keep the two (or more) indices separate such that they can be accessed, process or otherwise by utilized differently in different stages or processes by the content-by-example analysis engine 124b.

Now with an understanding of embodiments of how such a feature vector index 181 may be created and what embodiments of a feature vector index 181 may include, and various weighting mechanisms that may be utilized with such a feature vector index 181, embodiments of how content-by-example analysis engine 124*b* may utilize such a feature index 181 to determine a set 173 of withheld documents 107*b* of interest can be described.

It will again be recalled from the above discussion that feature vectorizer 127 and feature vector index creator 129 may process content-by-example log 171 to generate a feature vector index 181 where those features may be, for example, document identifiers of the most similar disclosed document 107*a* (referred to as index type one), words, phrases or other extractable features from the content of the similar documents 107*a* (referred to as index type two), or a two (or more) part feature vector index 181 comprising separate indices for document identifiers of the most similar disclosed document 170*a* and words, phrases or other extractable features from the content of the similar documents 170*a* (referred to as index type three).

Accordingly, content-by-example analysis engine 124*b* may utilize almost any information retrieval technique or machine learning technique in association with the feature vector index 181 to determine withheld documents 107*b* of interest. In certain embodiments then, the content-by-example engine 124*b* may utilize information retrieval to determine document identifiers of the withheld documents 107*b* of interest, using document identifiers of disclosed documents 107*a* as queries (e.g., using index type one) or text content from the disclosed documents 107*a* as queries (e.g., using index type two or three).

The content-by-example engine 124*b* may also classify the document identifiers of withheld documents 107*b* using supervised machine learning techniques, based on labeled (e.g., positive or negative) examples of other document 107 from the same content-by-example log 171 (e.g., using the values in index type one, two or three). This labeling may come about, for example, as a result of feedback from the producing party. The content-by-example analysis engine 124*b* may also cluster (document identifiers of) withheld documents 107*b* using unsupervised machine learning techniques (e.g., using the values in index type one, two or three). More generally then, content-by-example engine 124*b* may employ almost any information retrieval or machine learning techniques for exploring, slicing, dicing, querying, ranking, visualizing, etc. withheld documents 107*b* utilizing an embodiment of a feature vector index 181 of feature vectors to determine withheld documents 107*b* of interest.

Specific techniques employed by embodiments of a content-by-example analysis engine 124*b* to analyze content-by-example log 171 using feature vector index 181 to determine a set 173 of withheld documents 107*b* of interest can now be described in more detail. It will be understood that, though such techniques may be described with respect to particular embodiments (e.g., types) of a feature vector index 181, such methods or similar methods may also be effectively utilized with other embodiments of a feature vector index. As mentioned previously, this analysis may take into account a myriad of factors given the real-world desire to limit the number of requests for withheld document or other information (e.g., challenges to privilege, for example, an attorney may not wish to spend the money or resources, or risk the ire of a judge, by issuing too many challenges), along with the dual inquiries of (1) whether enough is known about the possible topics that appear to be covered in the withheld documents (referred to as coverage) and (2) whether enough is known about the specific substance of topics in the withheld documents (e.g., the topics determined to be important or "hot"—referred to as focus).

Figure 7:
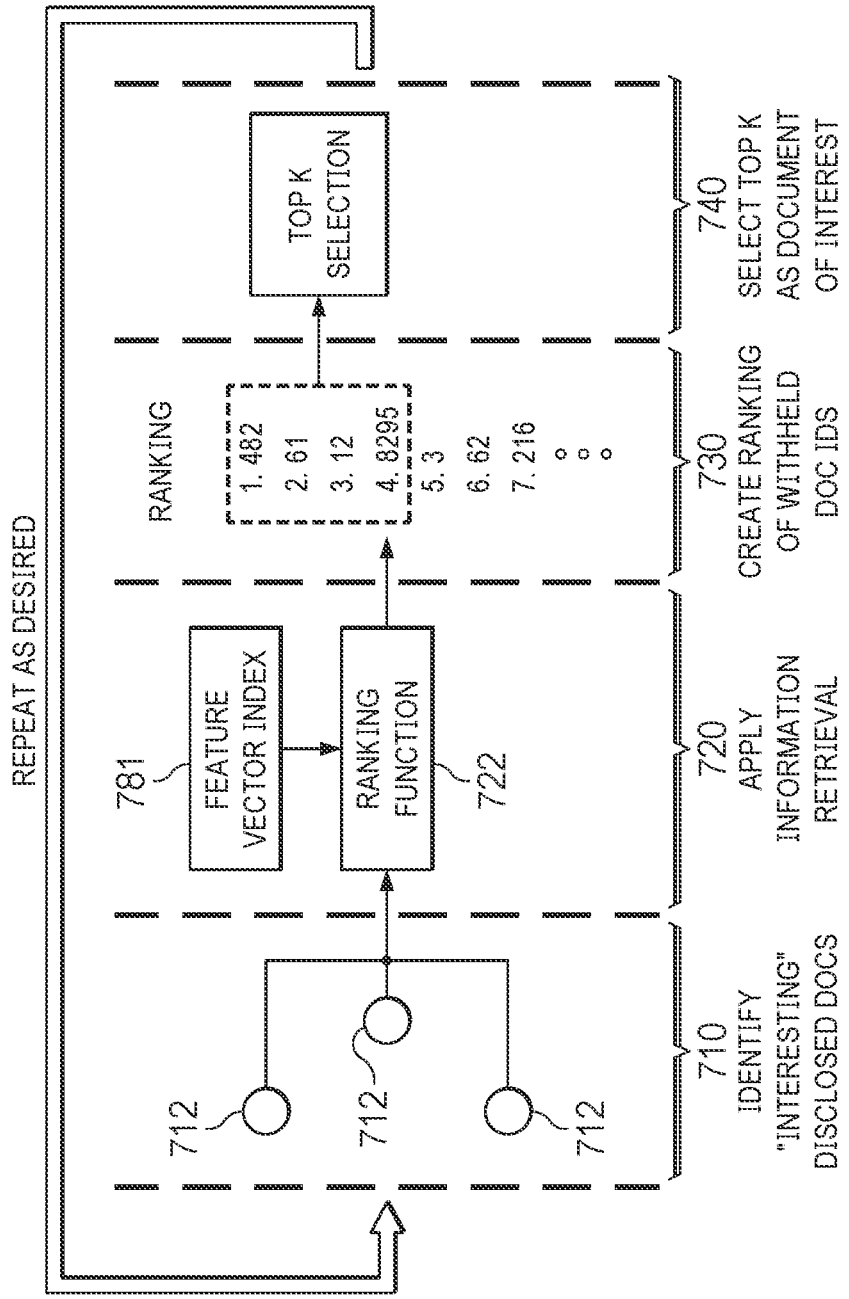
FIG. 7 is a diagram of one embodiment of a method for determining withheld documents of interest.

Moving to FIG. 7, one embodiment of a method for determining withheld documents of interest from a content-by-example log using an embodiment of a feature vector index created based on that content-by-example log is depicted. It will be noted that embodiments of the same or similar methods of utilizing information retrieval or machine learning techniques may also be utilized to analyze the content-by-example log such as to determine characteristics of withheld documents, such as to estimate counts of documents with certain facets or characteristics or otherwise. Here, at step 710, disclosed documents 712 of interest may be selected. These disclosed documents 712 may be determined in almost any manner desired. In some cases these documents 712 may be specified by a user. For example, these disclosed documents 712 may be "hot" documents in a litigation context or could be a sampling of documents that cover a variety of topics of interest. These disclosed documents 712 could also be a single document that, by itself, covers multiple issues of interest (e.g., a document that is relevant to many different aspects or facets of a matter).

Depending on the index type (as discussed above) the documents of interest 712 may be used to construct a query using the document identifiers of the disclosed documents of interest, or using words, phrases, or other textual features of the disclosed documents 712 that may be of interest (e.g., in the case where feature vector index 781 includes such features). Using an information retrieval technique at step 720 (e.g., Boolean matching, TF.IDF, BM25, language modeling, learning to rank, etc.) that includes a ranking function 722, the constructed query may be applied to the feature vector index 781 to rank the withheld documents (e.g., identifiers of those withheld documents) and a ranked list of the withheld documents (e.g., the identifiers of the withheld documents) can be created at step 730. A number (e.g., k) of documents may then be selected from the top of the ranked list as being withheld documents of greatest interest at step 740.

Such a method for determining withheld documents of interest may be especially useful for ensuring that a desired focus has been achieved (searching for withheld documents that may provide novel or critical information pertaining to topics of interest in the litigation). However, embodiments may also be used to ensure desired topical coverage. For example, at the end of the review of disclosed documents to determine disclosed documents 712 of interest, a query for every single one (or a broad subset) of those disclosed documents 712 of interest could be done individually to ensure that a wide set of (identifiers for) withheld documents are retrieved (e.g., at least some number for each disclosed documents 712 of interest that has been identified). As an alternative, withheld documents that do not have a strong correlation to any produced documents may be located, suggesting that the features are not prevalent in the disclosed docs. This may be accomplished, for example, by analyzing documents at the bottom of the ranked list of withheld docs (e.g., those with the weakest relationship to disclosed documents or features of those documents).

Figure 8:
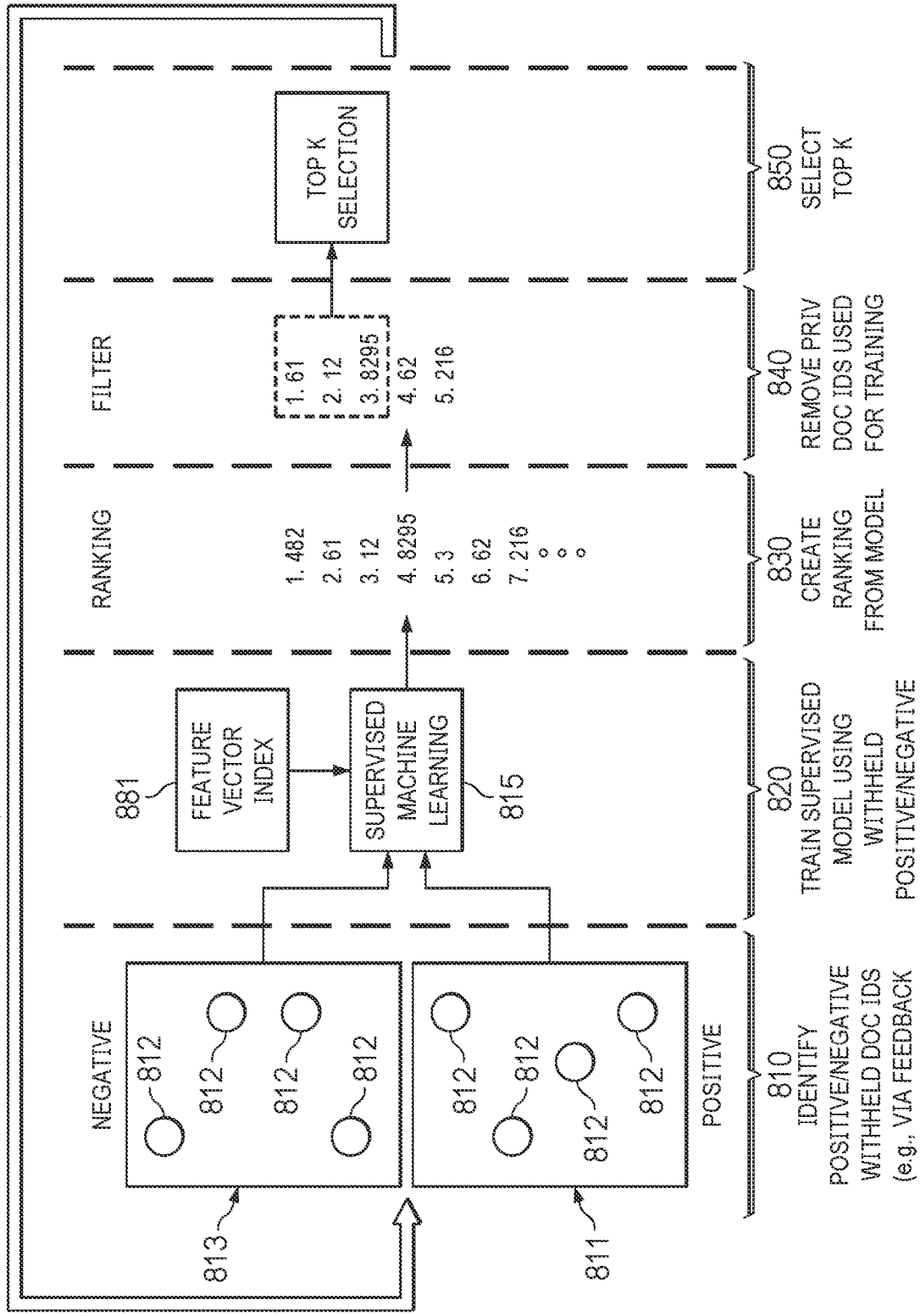
FIG. 8 is a diagram of one embodiment of a method for determining withheld documents of interest.

In FIG. 8 another embodiment of a method for determining withheld documents of interest from a content-by-example log using an embodiment of a feature vector index created based on that content-by-example log is depicted. In this case, withheld documents 812 may be labeled as to whether or not they appear to address topics or information of interest to the receiving party (e.g., would be of interest to a receiver at step 810. This creates a positive set 811 and a negative set 813 of withheld documents 812 (e.g., those that would be of interest or would not be of interest). A supervised machine learning model 815 can then be trained based on this positive set 811 and negative set 813 of withheld documents 812 at step 820 using the feature vector index 881. Specifically, the features associated with the documents 812 of the positive set 811 and negative set 813 (e.g., features comprising, for example, either the disclosed document identifiers for similar disclosed documents, or the features extracted from the content of the similar disclosed documents, each as associated with the withheld documents), as included in feature vector index 881, may be utilized in the training of the supervised machine learning model 815.

The trained supervised machine learning model 815 can then be applied to feature vector index 881 to predict which other documents address topics or information of interest to the receiving party. Specifically, the trained supervised machine learning model 815 may be applied to the feature vector index 881 to rank the withheld documents (e.g., identifiers of those withheld documents) and a ranked list of the withheld documents (e.g., the identifiers of the withheld documents) created at step 830. The ranked withheld documents (e.g., the identifiers of the withheld documents) may then be filtered at step 840 whereby withheld documents used for the training (or other withheld documents, such as those already determined to be of interest or not of interest), may be removed from the ranked list. A number (e.g., k) of documents may then be selected from the top of the remaining ranked list as withheld documents of interest at step 850. The selected ranked withheld documents of interest can then be used, for example, to challenge the withholding of those documents (e.g., challenge claim of privilege or the like). This process can be repeated as desired as more withheld documents are determined to be of interest or not of interest. Such a method for determining withheld documents of interest may be especially useful for ensuring that a desired focus has been achieved (searching for novel or critical withheld documents pertaining to specific topics of interest).

It will be noted that in some cases, this method may require interaction with a producing for interactive production or challenging of the withholding of documents such that feedback between the entity requesting the withheld content and the entity producing or withholding documents can be provided. In the main, this results from the initial state in which all withheld documents (withheld document identifiers) may be either labeled (e.g., as privileged, pseudo-privileged (assumed to be privileged but not known for sure) or as "unknown"). It may be that it is only when challenging the withholding of documents and successfully overturning the original designation that positive examples may be created (and similarly, denied requests could be used as negative training examples).

Figure 9:
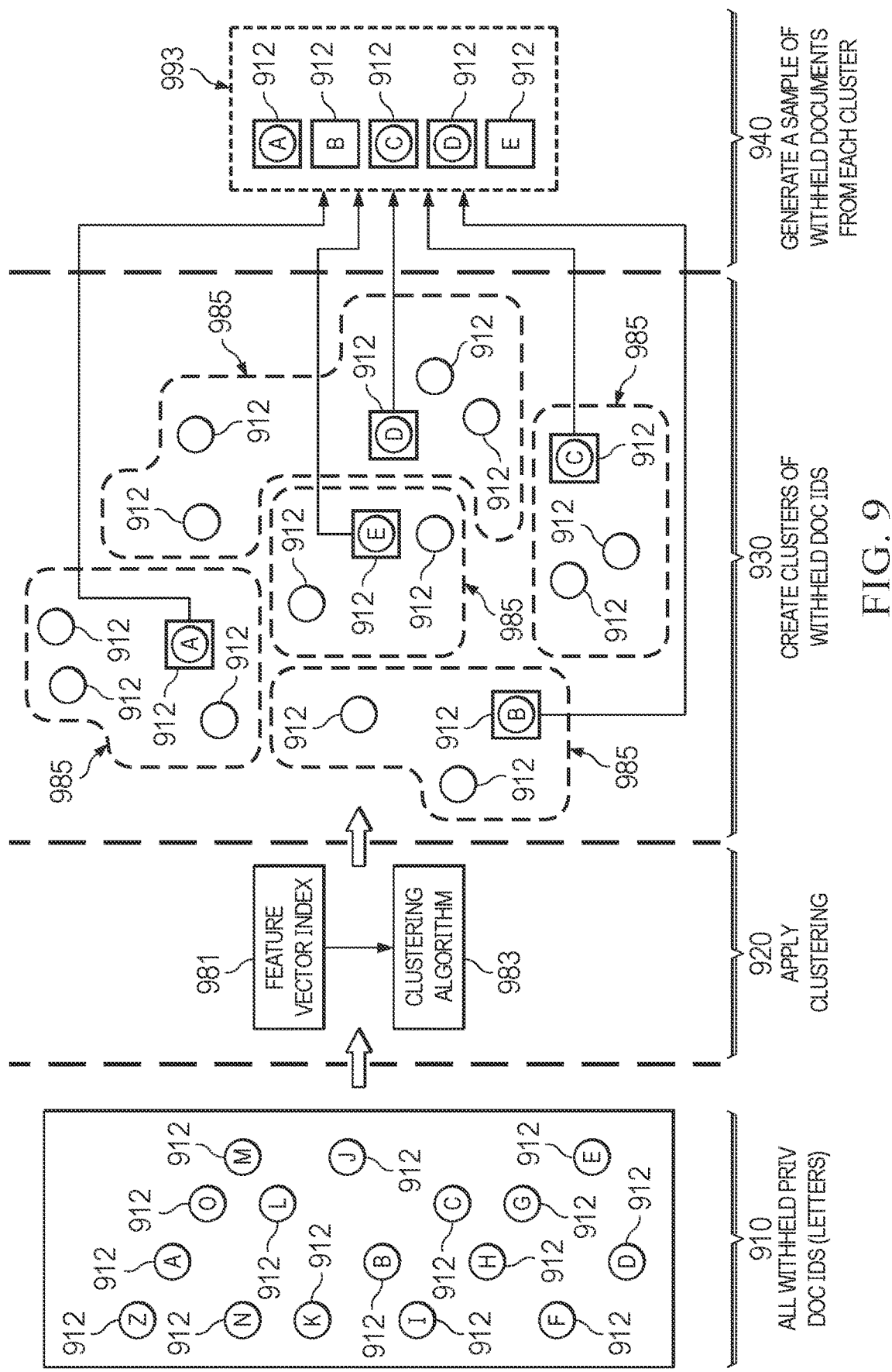
FIG. 9 is a diagram of one embodiment of a method for determining withheld documents of interest.

FIG. 9 depicts another embodiment of a method for determining withheld documents of interest from a content-by-example log using an embodiment of a feature vector index created based on that content-by-example log. Here, at step 910, all (or a subset of) the withheld documents 912 (e.g., document identifiers for the withheld documents) included in the feature vector index 981 may be provided to clustering algorithm 983 that may be applied at step 920 to cluster the withheld documents (e.g., the identifiers 912 of the withheld documents), based on the features for those withheld documents, to generate clusters 985 of withheld documents 912 (e.g., clusters of withheld document identifiers) at step 930. Specifically, the features associated with the withheld documents 912 (e.g., features comprising, for example, either the disclosed document identifiers for similar disclosed documents, or the features extracted from the content of the similar disclosed documents, each as associated with the withheld documents), as included in feature vector index 981, may be utilized by clustering algorithm 983 to create clusters 985 of withheld documents 912 (e.g., clusters of withheld document identifiers).

At step 940 a sample may be taken from one or more of the clusters 985 to select a set 993 of withheld documents 912 (e.g., identifiers of withheld documents) of interest. Sampling from a cluster 985 may be at random, or by representativeness (e.g., withheld document identifiers which are closer to the center of the cluster 985), or by manual intervention (e.g., a user using other information about the file type, file date, custodian, etc. associated with withheld documents 912 to determine which withheld documents (identifiers) to select from each cluster 985).

While almost any clustering algorithm desired may be utilized in various embodiments, certain clustering algorithms may be utilized in association with certain formats of feature vector index 981. For example, if feature vector index 981 is of type three (e.g., where it may include separate indices for document identifiers of the most similar disclosed documents, as well as words, phrases, or other extractable features from the content of the similar documents) clustering may be accomplished by creating clusters of disclosed documents based on the extracted features from those disclosed documents using the disclosed document index of the feature vector index. Samples from those clusters of disclosed documents (e.g., disclosed document identifiers) may then be taken and identifiers for each of the sample disclosed documents can then be used as a query to retrieve the most similar withheld document identifiers using the content-by-example index. Alternatively, the entire sample from a topical cluster of disclosed documents (e.g., identifiers for those disclosed documents) can be used as a combined query to retrieve the most similar withheld document identifiers (e.g., using the content-by-example index of the feature vector index). Such a method may be useful for ensuring that enough is known about all the possible topics that could be covered in the withheld documents (referred to as coverage).

Figure 10:
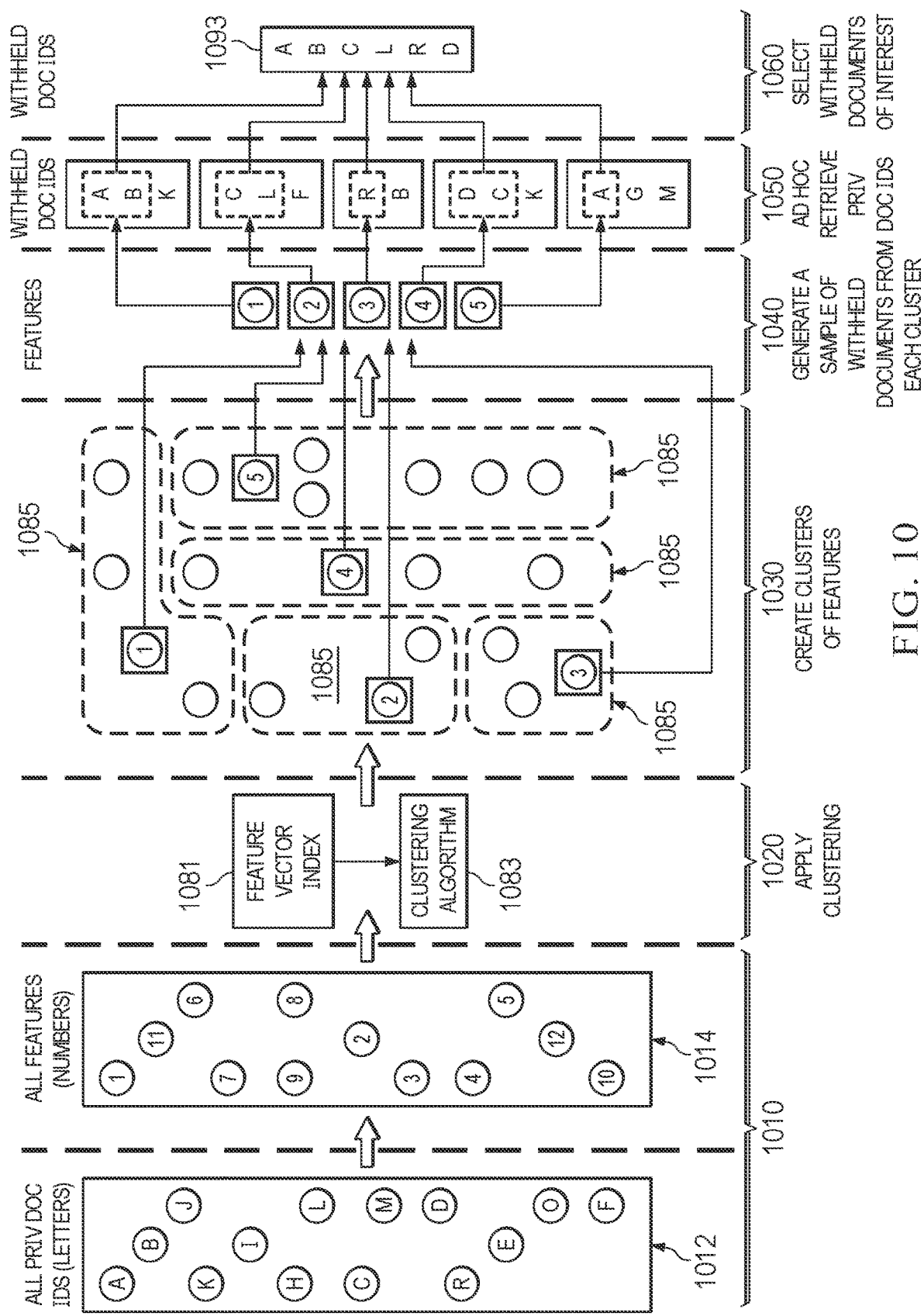
FIG. 10 is a diagram of one embodiment of a method for determining withheld documents of interest.

Moving now to FIG. 10, yet another embodiment of a method for determining withheld documents of interest from a content-by-example log using an embodiment of a feature vector index created based on that content-by-example log is depicted. The embodiment depicted in FIG. 10 is similar to that depicted in FIG. 9 except in the embodiment depicted in FIG. 10, instead of clustering documents by features, features may be clustered using documents (e.g., the similar documents or withheld documents with which they are associated). These clustered features can then be utilized to understand the range of topics that are in the withheld documents.

In one embodiment, at step 1010, all (or a subset of) the withheld documents 1012 (e.g., document identifiers for the withheld documents, here represented by letters) included in the feature vector index 1081, along with the features 1014 extracted from the withheld documents (here represented by numbers) may be provided to clustering algorithm 1083 that may be applied at step 1020 to cluster the features included in the feature vector index 1081 to generate clusters of features 1085 at step 1030.

At step 1040 a sample may be taken from one or more of the clusters 1085 to determine a set of features interest. For example, the centroid of each cluster of features 1085 may be selected as a feature of interest. These features of interest may in turn be utilized to select a set 1093 of withheld documents (e.g., withheld document identifiers) of interest using techniques appropriate for the feature vector index 1081. Steps 1050 and 1060 illustrate the selection of set 1093 of withheld documents of interest (e.g., withheld document identifiers) in instances where a type one feature vector index 1081 is utilized. Thus, the features in such case are disclosed document identifiers. Because the sample set of features of interest selected in step 1040 are disclosed documents (e.g., disclosed document identifiers), the disclosed documents (e.g., disclosed document identifiers) are clustered and centroids selected to determine the features of interest. In order to get from those features back to the withheld documents (e.g., withheld document identifiers), the features can be used to retrieve withheld documents (e.g., withheld document identifiers) at step 1050 and a set of these retrieved withheld documents (e.g., withheld document identifiers) are selected as a set 1093 of withheld documents of interest.

Here, clustering may involve clustering the disclosed documents (e.g., identifiers for the disclosed documents) by the withheld document identifiers to which they are similar. In other words, the feature vectors included in the index for a withheld document in the feature vector index 1081 may be inverted, so instead of withheld document identifiers being indexed to their features, the inverted index may include features that are indexed by their associated withheld document identifiers. The features can then be clustered in the withheld document identifier space.

Those document clusters 1085 could then be examined in terms of other information that is known about those documents. For example, if disclosed documents have already been reviewed and tagged them with respect to different facets of interest, withheld document identifiers could then be selected from a cluster with high concentrations of facets of interest. Those withheld documents (e.g., identifiers) could then be used (e.g., in an ad hoc manner) to retrieve withheld documents (e.g., withheld document identifiers) of interest.

In cases where features included in the feature vector index 1081 are the text or other features (words, phrases, word vectors, etc.) that are extracted from the disclosed documents (or otherwise associated with the disclosed documents like metadata, privilege declaration, etc.), by clustering those features by their similarity to the withheld document (identifiers), the user may be able to see clusters of words, phrases, etc. Such clusters can then suggest to the user words, etc. to use to retrieve (e.g., in an ad hoc manner) withheld documents (e.g., identifiers) of interest.

If feature vector index 1081 is of type three (e.g., where it may include separate indices for document identifiers of the most similar disclosed document and words, phrases or other extractable features from the content of the similar documents) the disclosed documents (e.g., identifiers) may first be clustered by the associated withheld documents (e.g., as described above) then all the document identifiers in a cluster can be used to (e.g., ad hoc) retrieve a set of features (e.g., words, phrases, etc.) using the disclosed document index of the feature vector index 1081. Those retrieved words, phrases, etc. can then be used to (e.g., ad hoc) retrieve withheld documents (e.g., identifiers) using the content-by-example index of the feature vector index 1081.

As can be seen, the use of clustering to determine withheld documents of interest may aid with topical coverage of a corpus by ensuring that samples (e.g., withheld documents of interest) from the corpus may cover broad, disparate set of documents. However, not all documents fit cleanly into clusters and not all documents have larger sets of documents with which they share affinity. To that end, anomaly detection algorithms may be used to identify documents (e.g., withheld documents) that do not fit cleanly into any cluster. Coverage can thus be increased by "searching through the cracks" via anomaly detection to identify withheld documents that might not be detectable by other means. It will be noted here as well that if a withheld document does not have a high or relatively high similarity score to any (or only a small set) of disclosed document, those withheld documents (e.g., identifiers for those withheld documents) may be shown or surfaced to a user as well (or instead).

Figure 11:
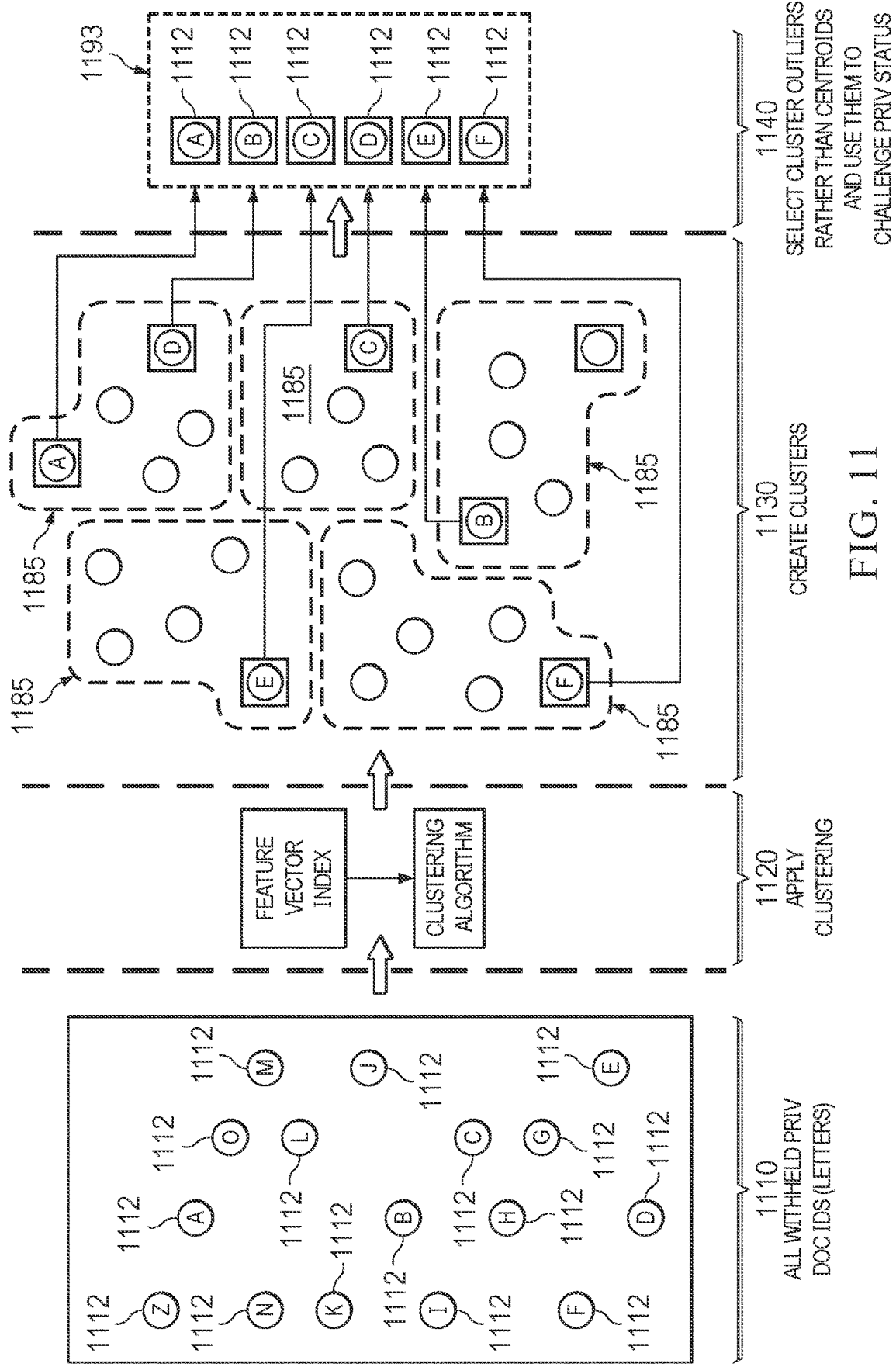
FIG. 11 is a diagram of one embodiment of a method for determining withheld documents of interest.

Turning to FIG. 11 then, an embodiment of a method for determining withheld documents of interest from a content-by-example log using anomaly detection is depicted. Anomaly detection may be done in an unsupervised manner, by clustering documents or features and then detecting documents or features that lie at the edge or outside of those clusters (e.g., outliers). As depicted, an embodiment may cluster withheld documents 1112 at step 1110 and 1120 to generate clusters 1185 of documents 1112 at step 1130 in a similar manner to those described above. It will be noted here, however, that features may instead (or additionally) be clustered as described above (e.g., with respect to FIG. 10). Anomalies (e.g., outliers) relative to the generated clusters 1185 may be selected at any point in the process at step 1140. For example, where withheld documents (withheld document identifiers) are clustered, an anomalous withheld document (identifier) can be selected (e.g., from each or a subset of cluster 1185) directly using an anomaly detection algorithm to select a set 1193 of withheld document (identifiers) 1112 of interest. In cases where features are being clustered (whether features comprising disclosed document identifiers or extracted (e.g., text) features), anomalous disclosed document identifiers or anomalous text features may be chosen, and then ad hoc methods can be used to retrieve the (e.g., "best") related withheld document identifiers as withheld documents of interest (e.g., as described above).

Anomaly detection to determine withheld document identifiers of interest may also be done in a supervised manner. Such a supervised approach using anomaly detection may be similar to the embodiment of determining withheld documents of interest described with respect to FIG. 10. In the supervised approach, existing documents are labeled as to whether they are anomalous or not. Anomalous examples (e.g., of withheld documents or of disclosed documents) are used as positive training data while non-anomalous examples of documents (e.g., their identifiers) may be utilized as negative training data. A supervised machine learning algorithm may then be trained to classify unlabeled examples of documents e.g., withheld document identifiers) by their likely anomalousness.

To obtain such labels in the absence of access to withheld documents, wherein each withheld document could be, for example, represented by its feature vector comprising extracted (e.g., text) features, the user may then examine these feature vectors and see if there are any that appear significantly different from others. The user can then label the withheld document (identifier) as an anomaly (e.g., a positive training example) or not.

As another example, labeling of anomalies could be done by a user on disclosed document (e.g., identifiers) based on the associated extracted features. Supervised learning could then use these labels along with the disclosed document index (associating the disclosed document identifiers with extracted features) to detect anomalous disclosed document (e.g., identifiers) and then use (e.g., ad hoc) search methods on the content-by-example index based on those anomalous disclosed document identifiers to retrieve the most similar withheld documents (identifiers). These retrieved withheld document identifiers may be determined to be the most anomalous) withheld documents and thus the withheld documents of interest.

As discussed, embodiments as disclosed may use machine learning or information retrieval techniques to analyze a content-by-example log. Other approaches may, however, be utilized to find withheld documents of interest in other embodiments. For example, embodiments may examine the content-by-example log directly and look for withheld documents identifiers whose most similar disclosed document(s) lies at an extreme (e.g., low or high) relative to one another, or relative to similar disclosed documents for other withheld document (identifiers). An example may assist in illustrating such an approach. Assume for purposes of such an example that a content-by-example log includes the following entries for two withheld documents (having identifiers "Priv_2" and "Priv_10432") where the content-by-example log includes ranked most similar disclosed documents along with an associated similarity score:

|  | Rank 1 | Rank 2 | Rank . . . | Rank k |
| --- | --- | --- | --- | --- |
| Priv_2 | id_122 | id_103 | . . . | id_114 |
|  | 0.05 | 0.02 | . . . | 0.001 |
| Priv_10432 | id_108 | id_133 | . . . | id_104 |
|  | 0.98 | 0.97 | . . . | 0.96 |

Here, the top ranked, first most similar disclosed document (e.g., identified by "id_108") to the withheld document identified by "Priv_10432" has a very high score (0.98 out of 1.0), as does the second one (e.g., disclosed document identified by "id_133"). With absolute value scores that (e.g., extremely) high, there is a good chance that these documents (e.g., the withheld document identified by "Priv_10432" and disclosed documents identified by "id_108" and "id_133") are very near duplicates of each other. The question then becomes why was disclosed document "id_108" not withheld, and document "Priv_10432" withheld? It could have been legitimately withheld, and the small 0.02 difference in the score a result of a legitimate reason (e.g., the same exact content being intentionally sent to a lawyer as privileged communication), but document "Priv_10432" may have been incorrectly withheld.

Still referring to the example, withheld documents "Priv_2" represents the other extreme. Out of all the disclosed documents in the entire collection, not a single disclosed document has a similarity score higher than 0.05 out of 1.0. Why is this document "Priv_2" not similar to anything else in the corpus? This question may be especially germane in certain contexts such as litigation where documents that are not relevant to a request are typically not fed through a privilege review. One possibility is that it is of a type of document that does not lend itself well to similarity calculations (e.g., an image or Excel file). Such cases could be filtered out by examining this document (e.g., using metadata in a privilege log), as explained earlier, and ignoring those documents that are images or Excel files. But it could also be that this is a document that was incorrectly withheld.

While these types of documents may be detectable via embodiments of analyzing content-by-example log using machine learning or information retrieval as disclosed, they may escape detection by such embodiments. Accordingly, by simply analyzing the raw, unadulterated scores and determining which withheld documents have disclosed document similarity scores that are outliers is another way of detecting documents that were potentially improperly withheld (e.g., are not privileged).

Figure 12:
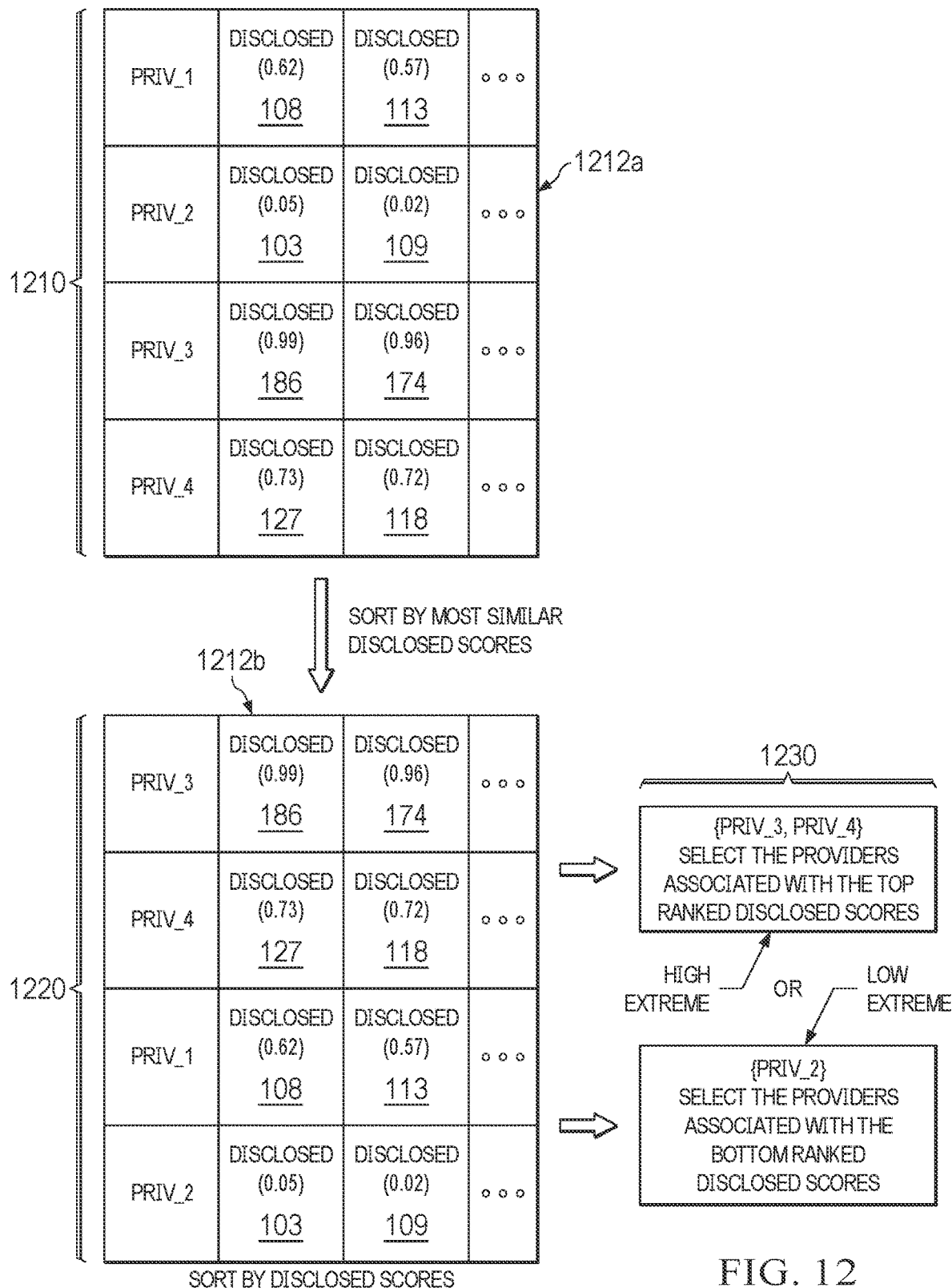
FIG. 12 is a diagram of one embodiment of a method for determining withheld documents of interest.

FIG. 12 depicts one embodiment of a method for determining withheld documents of interest from a content-by-example log by determining associated disclosed documents with outlying similarity. At step 1210 a content-by-example log 1212a may be received where the content-by-example log may include withheld documents identifiers associated with a list of associated disclosed documents and similarity scores for those disclosed documents relative to that withheld document. At step 1220 the content-by-example log may be sorted using the similarity scores of the similar disclosed documents associated with the withheld document identifiers to produce a sorted content-by-example log 1212b. For example, the content-by-example log can be sorted by the similarity score of the most similar document for each withheld document identifier, or by the weighted average of a top number most similar documents for each withheld document identifier. At step 1230 a number of withheld documents (identifiers) from the top of the sorted content-by-example log 1212b (e.g., having extreme high similarity) or bottom of the sorted content-by-example log 1212b (extreme low similarity) may be selected as withheld documents of interest.

While embodiments of methods for determining withheld documents of interest have been described mainly in association with a content-by-example log including withheld document (identifiers) associated with similar disclosed documents, it will be noted that other information in addition to those disclosed similar documents may be utilized to determine withheld documents of interest. As mentioned previously, additional information about withheld documents may be provided either in the content-by-example log or separate and apart from the content-by-example log. Such additional information may include metadata regarding the withheld document (e.g., file type, file date, custodian (document owner), or people involved in a communication, etc.), information regarding why the document is being withheld (e.g., a claim of privilege or type of privilege being asserted), information about why the set of example documents associated were determined to be similar to the associated withheld document, or other information.

Embodiments may utilize such additional information in association with embodiments of previously described methods to filter (e.g., cull), select (e.g., expand or contract), or otherwise modified or reweight (e.g., withheld) documents at any stage (e.g., beginning, middle, end) in embodiments of any of those methods. Specifically, in particular embodiments, once withheld documents of interest have been selected, one can compare that selection against other type of information that might also be available (e.g., a metadata privilege log) and use that to identify gaps in metadata or in categories. It may be useful to describe these types of embodiments. For ease of description such an embodiment will be described using a privilege log as a content-by-example log and the additional information that may be provided on withheld documents as a (e.g., separate) metadata privilege log without loss of generality.

Figure 13A:
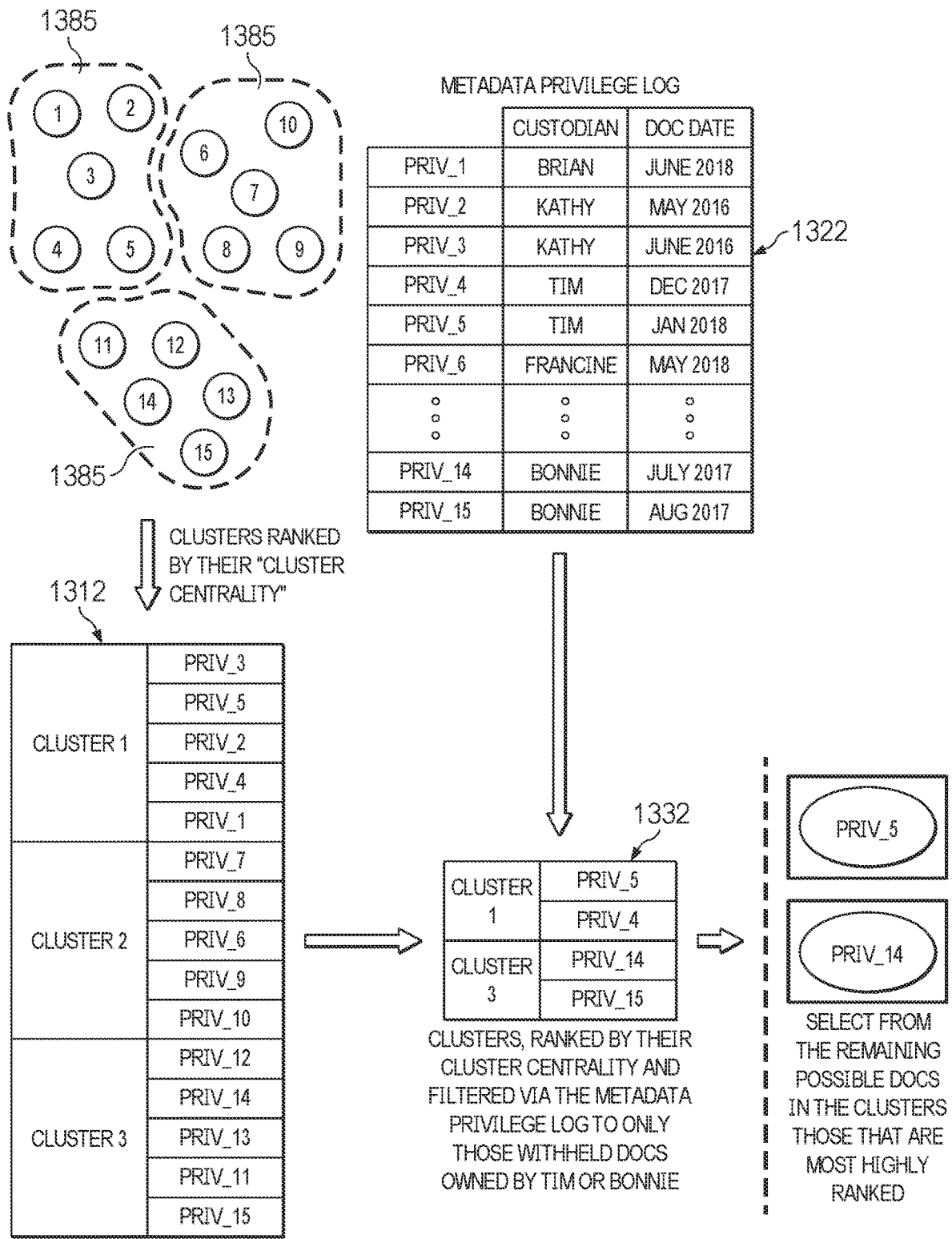
FIGS. 13A and 13B are diagrams of examples of a method for determining withheld documents of interest.

FIG. 13A depicts an example of one embodiment of selecting withheld documents of interest utilizing a metadata privilege log. As discussed above, according to certain embodiments clusters 1385 of withheld documents (identifiers) may be determined. These withheld documents can then be ranked by their distance from the center of their respective cluster (their "centroidal distance") to produce a ranked list 1312. As previously discussed, cluster centroids (or withheld documents closest (or farthest) from the center for the cluster 1385) may then be selected as withheld documents of interest.

In some embodiments, however, after the clustering has been done and documents ranked by their centroidal distance, but before the actual cluster centroids are selected, it is possible to utilize the metadata in a metadata privilege log 1322 to alter the "centroidal" withheld documents that get selected. In this example, the metadata privilege log 1322 includes two pieces of data: document owner information (aka "custodian") and a document date associated with each withheld document identifier.

Assume for purposes of this example that a user is only interested in two custodians: Tim and Bonnie. The metadata privilege log 1322 can be used to filter the cluster centroid rankings 1312 by removing from the cluster centroid distance rankings 1312 any withheld document that is not owned by either Tim or Bonnie. In this example, this filtering yields a cluster centroid distance ranking 1332 with only two clusters: Clusters 1 and 3. And in each cluster, there are only two withheld documents (identifiers)-"priv_4" and "priv_5" in the first cluster (Cluster 1), and "priv_14" and "priv_15" in the second cluster (Cluster 3). In each cluster (1 and 3), however, these withheld documents are still ranked by their distance to the cluster centroid of the associated cluster. Thus, of the withheld documents of each remining cluster (1 and 3), the withheld document of that cluster that is the nearest to the cluster centroid may be selected as a withheld document (identifier) of interest. Namely "priv_5" in Cluster 1 and "priv_14" in Cluster 3 in this example. In other words, those are the withheld documents "nearest" to the cluster centroids of their respective clusters, but that have either Tim or Bonnie as a custodian.

Figure 13B:
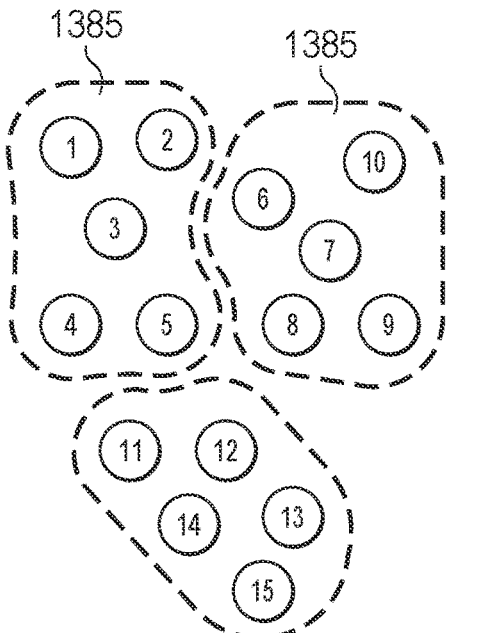

FIG. 13B depicts another example of an embodiment of selecting withheld documents of interest utilizing a metadata privilege log. Again, metadata privilege log 1322 includes two pieces of data: document owner information (aka "custodian") and a document date associated with each withheld document identifier while clusters 1385 of withheld documents (identifiers) may be determined and the withheld documents ranked by their distance from the center of their respective cluster (their "centroidal distance") to produce a ranked list 1312.

In this example, however, instead of just selecting a centroid of each cluster, a user may desire to make sure that every custodian is represented at least once in the set of selected withheld documents of interest. In other words, a user may specify that they desire to obtain a set of withheld documents of interest where that set includes at least one withheld document (identifier) for every custodian identified in the metadata privilege log 1322.

Here, if the cluster centroids of every cluster were selected as the withheld documents (identifiers) of interest, such a selection would yield "priv_3" from Cluster 1, "priv_7" from Cluster 2, and "priv_12" from Cluster 3. These three documents are, however, associated with at most three custodians (e.g., Kathy, Bonnie, and another possible custodian) So while such withheld documents may be the cluster centroids, these selected withheld documents (identifiers) may only represent three people. Other custodians (e.g., Brian, Tim, and Francine) are not represented in any way by those selected withheld documents. To select withheld documents (identifiers) associated with each custodian, in one embodiment, the next most highly ranked documents in the ranked list 1312 of withheld documents ranked by centroid distance and associated with a custodian not represented in the set of selected withheld documents may be selected (e.g., cluster "near"-centroids) until the entire custodian population identified by the metadata privilege log 1322 (in this example, Brian, Tim, and Francine) are represented in the selected withheld document (identifiers). For example, in this example "priv_5" (Tim) and "priv_1" (Brian) may be selected from Cluster 1, and "priv_6" (Francine) may be selected from Cluster 2. In this manner a set of withheld documents of interest that includes at least one withheld document (identifier) for every custodian identified in the metadata privilege log 1322 may be determined.

It will be noted that other data associated with withheld documents in a metadata privilege log may be utilized similarly. For example, temporal coverage rather than custodial coverage may be desired by ensuring that enough near-centroids were selected from each cluster so as to cover the entire time span of the documents as given by the document dates for withheld documents in the metadata privilege log. Similar coverage ideas could be applied to other metadata as well.

It will also be noted that while particular examples have been described in association with particular embodiments of methods for determining withheld documents of interest, filtering using metadata privilege logs may also be utilized with other embodiments of determining withheld documents of interest such as ad hoc searching (e.g., by filtering search results to certain custodians or date ranges) or with supervised machine learning (e.g., by filtering either the training data (inputs) or the predictions (outputs) by custodian, date range, etc.). Other mechanisms for filtering withheld documents of interest using such a metadata privilege log are possible and are fully contemplated herein.

As may be realized a wide variety of embodiments of systems and methods for the generation of content-by-example logs and their analysis have been disclosed. Such content-by-example logs and their analysis may be utilized in a wide variety of contexts. In many of these contexts once such a content-by-example log is generated, it may be provided to a receiver. In this manner, a producing party may provide information to the receiver on a set of documents withheld from the receiver (but which may still be of interest to the receiver) in terms of disclosed documents to which the receiver has access. The receiving party can then utilize this content-by-example log to, for example, make determinations regarding the withheld documents, including to obtain more information about the claim of privilege, more information on the withheld document, or to actually obtain the withheld document itself. Such a process may be an iterative process.

Figure 14:
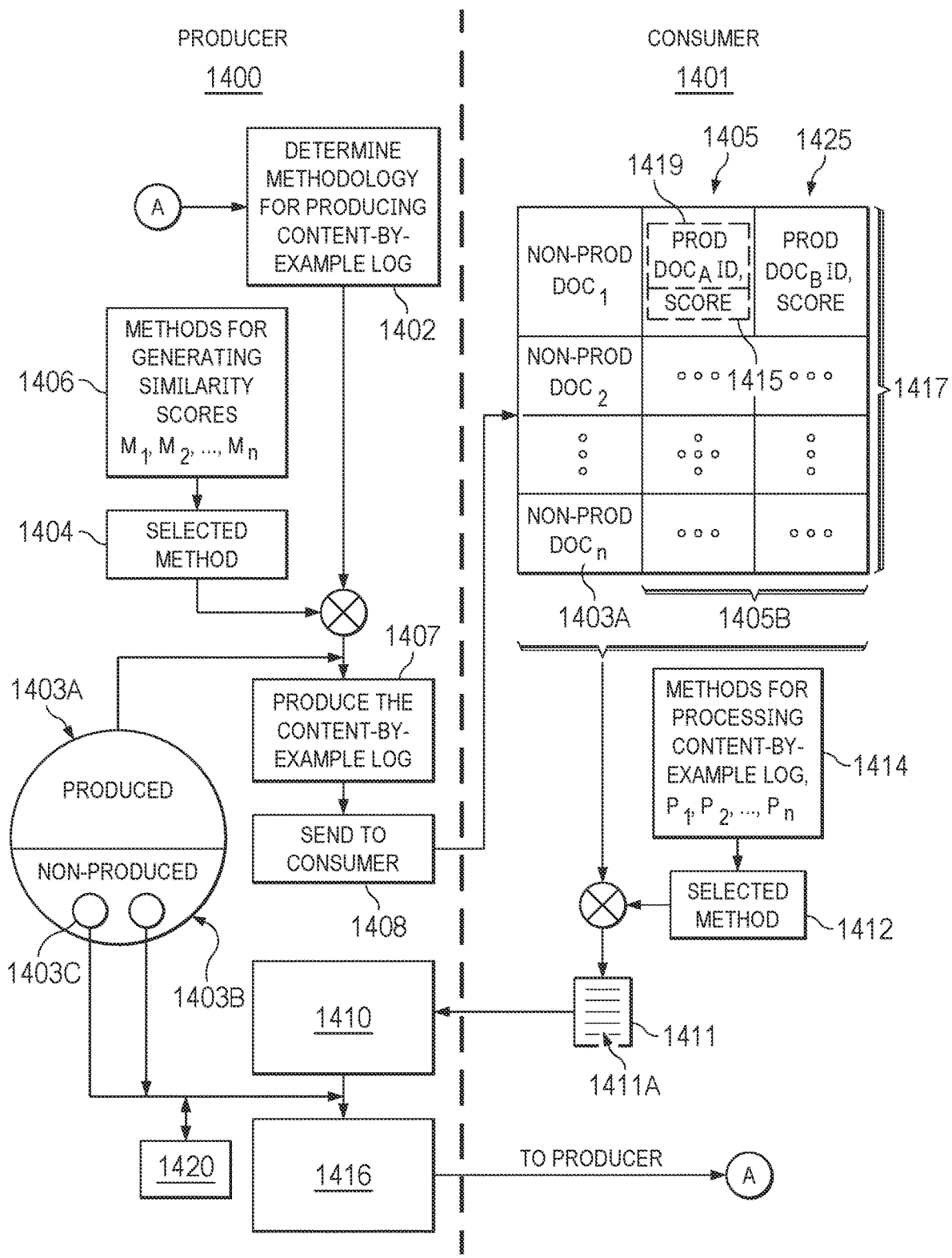
FIG. 14 is a diagram of a process for document production and consumption.

Referring now to FIG. 14, the inventive system, methods, and techniques, in a non-limited embodiment, relate to a process for document production and consumption. The process comprises, at 1402, determining a methodology for producing a content-by-example log 1405, the methodology comprising a technique for comparing a set of non-produced documents to a set of produced documents. Process may occur between parties, such as a producer party X00 that produces the content-by-example log 1405 and a consumer party 1401 that consumes the content-by-example log 1405. The set of produced documents 1403A and the set of non-produced documents 1403B may be derived from a corpus of documents 1403. The corpus of documents 1403 may include documents related to a particular problem domain, organizational context and/or framework, and/or may be derived from a standard for defining an initial set of documents for production and consumption. It will be well understood by one of ordinary skill in the art that the process for document production and consumption may be applied in several different non-limiting scenarios, such as for electronic discovery related to litigation, a request for documents related to the Freedom of Information Act (FOIA), a request for documents which exist on the Internet and/or an organization's Intranet, etc. A non-produced document comprises a document, communication, and/or a tangible thing not produced or disclosed.

Before delving further into the details of the inventive subject matter, it may be useful to provide a general summary of procedures for document production in a particular non-limiting scenario, such as in the Federal Civil Court System of the United States. Federal Rules of Civil Procedure (FRCP) 26(b)(5) can be said to govern and summarize the spirit for document production and withholding of documents in federal civil suits. FRCP 26(b)(5) quotes:

When a party withholds information otherwise discoverable by claiming that the information is privileged or subject to protection as trial-preparation material, the party must . . . (iii) describe the nature of the documents, communications, or tangible things not produced or disclosed—and do so in a manner that, without revealing information itself privileged or protected, will enable other parties to assess the claim.

It can be said that the producing party that withholds documents (i.e., the non-produced documents) may comply with FRCP 26(b)(5)(A) by generating, for each non-produced document, a reference in a privilege log that comprises the date, type of document, author(s), recipient(s), general subject-matter of the document, and the privilege being claimed (e.g., attorney-client privileged).

With respect to the inventive subject matter, the producer party generates a content-by-example log that provides comparisons between each non-produced document and one or more produced documents. The consumer party may request information regarding the comparisons and then make an informed judgement as to whether to request access to a non-produced document, which may be referred to as a challenge when the parties are adversarial. In this way, the consumer may shed light on the contents and value of a non-produced document[s] (by example with and in view of the produced documents) to form a basis for requesting the non-produced document. Additionally, the producer need only produce comparisons from the content-by-example log once, or a few limited times, rather than having to regenerate a summary to comply with multiple production inquires (such as by complying with FRCP 26(b)(5)(A)).

In some embodiments, the content-by-example log 1405 includes a comparison between the set of non-produced documents 1405A (NON-PROD DOC1, NON-PROD DOC2, . . . NON-PROD DOCn) to the set of produced documents 1405B (PROD DOCA, PROD DOCB). The comparison may include, but is not limited to, a description or a summary of the contents and/or metadata of the non-produced document, which can be said to be the "content-by-example" information of the non-produced documents.

In still further embodiments, the comparison of the content-by-example log 1405 lists one or more of the non-produced documents 1405A and compares them with the produced documents 1405B. In yet further embodiments, the comparison comprises a similarity score (generally designated by reference numeral 1415) between the non-produced documents 1405A and the produced documents 1405B and in some instances, the produced documents 1405B may be ranked by similarity score in rows 1417 for each non-produced document 1405A. Further, each of the non-produced and produced documents may have unique identification references (generally designated by reference numeral 1419) which are included in the log cells (generally designated by reference numeral 1425) along with each similarity scores 1415.

In further embodiments, at 1404 the method for generating similarity scores for the non-produced and produced documents is selected from a set of methods M1, M2, . . . Mn (generally designated by reference numeral 1406) for similarity score generation. One of ordinary skill in the art will recognize that there are a variety of different similarity score generation methods 1406, many of which are described in this specification for illustrative, non-limiting purposes. In still further embodiments, the method 1406 is agreed upon by the producer party 1400 and consumer party 1401. The method 1406 may be based on a standard for content-by-example log production, the standard based on the context for document production and consumption.

At 1407, the content-by-example log 1405 is produced and, at 1408, the content-by-example log 1405 is sent to the consumer. At 1410, a request 1411 is received, the request 1411 including information (generally designated by reference numeral 1411A) regarding one or more non-produced documents. In a further embodiment, the request 1411 is a request to produce at least one of the non-produced documents. Such a request may be considered a challenge by the consumer party to produce one or more of the non-produced documents. The consumer party may also request content-by-example criteria for non-produced documents, which may further include the comparisons.

At 1416, the producer responds to either provide the non-produced documents, or justifications for not producing the non-produced documents which include the content-by-example criteria and, further, the comparisons. The content-by-example criteria may include the similarity scores between the non-produced document and the produced documents, which may be ranked. In other instances, the content-by-example criteria may include other document information and metadata, such the date, type of document, author(s), recipient(s), general subject matter of the document, and the privilege being claimed (e.g., attorney-client privileged). To the extent that this information has already been generated by the producer party and stored and/or referenced in the content-by-example log, the information need not be regenerated to comply with each consumer party request, which may advantageously result in time, cost, and resource savings.

In still further embodiments, at 1412 a method 1414 for analyzing similarity scores in the content-by-example log is selected from a set of methods P1, P2, . . . Pn (generally designated by reference numeral 1414) for processing and analyzing similarity scores and selecting which non-produced documents to further request. Much like the methods 1406 for similarity score generation, one of ordinary skill in the art will recognize that there are a variety of different analysis and selection methods 1414, many of which are described in this specification. In still further embodiments, the method 1414 is agreed upon by the producer party 1400 and consumer party 1401. The method 1414 may be based on a standard for content-by-example log analysis, the standard based on the context for document production and consumption. Further, in some embodiments, process is an iterative process, as designated by "A", in which the content-by-example log 1405 is produced, analyzed, and further consumer requests regarding non-produced documents are received. The iterative process can hone document production and consumption, each iteration providing enhanced, more responsive analysis, and more focused production. In some instances, an algorithm is employed and fed by human feedback related to the responsiveness and effectiveness of not only the generated content-by-example log 1405, but also the application of the methods for similarity score generation 1406 and the methods for log analysis 1414. In this way, the process for document production and consumption affords several advantages over prior art methods, systems, and techniques.

In a non-limiting example in the realm of electronic discovery, an initial corpus of documents can be segregated in a content-by-example privilege log with direct document comparisons, avoiding time-consuming and resource-intensive producer manual processes, such as the reviewing and providing descriptions of the documents. Also, process can provide a highly informative log that allows the consumer to better understand privileged documents by reviewing similarities with exposed non-privileged documents, and therefore more effectively challenge and potentially obtain documents initially designated as privileged. In other contexts, process facilitates distilling, reviewing, and requesting non-produced documents by more readily examining similarities of the non-produced documents with produced documents. Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet) or another computer, or in a stand-alone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can be executed on a single computer processing device or multiple computer processing devices, a single computer processor or multiple computer processors. Data may be stored in a single storage medium or distributed through multiple storage mediums and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A method of document production and consumption of a corpus of electronic documents, comprising:
   at a producer party computing device:
      determining, by a producer party having access to both a set of non-produced documents of the corpus and a set of produced documents of the corpus, a method ology for producing a content-by-example log for the corpus of electronic documents, the methodology comprising a technique for comparing the set of non-produced documents of the corpus to the set of produced documents of the corpus, the content-by-example log comprising an electronic file including a comparison between the set of non-produced documents and the set of produced documents identifying a produced document with one or more of the set of non-produced documents;

producing, by the producer party, the content-by-example log and sending the content-by-example log to a consumer party, wherein producing the content-by-example log comprises applying, at the producer party computing device, a first machine model adapted to implement the methodology for comparing the set of produced documents to the corpus of electronic corpus of documents to identify the produced document with the one or more of the set of non-produced documents; and providing electronic access to the set of produced document of the electronic corpus to a consumer party such that the consumer party can access the set of produced documents of the corpus at a consumer party computer device but cannot access the set of non-produced documents corpus; and receiving a request from the consumer party regarding the set of non-produced documents, the request based on a methodology for analyzing the content-by-example log applied to the content-by-example log using a second machine learning model at the consumer party computing device by applying the second machine learning model to evaluate attributes of the set of produced documents identified for each of the non-produced documents identified in the content-by-example log to determine one or more the set of non-produced documents identified in the content-by-example log as documents of interest to the consumer party that cannot access the non-produced documents, the application of the second machine learning model comprising:

determining values for a set of features associated with the second machine learning model for the non-produced document; and applying the second machine learning model to the values for the set of features to generate output of the second machine learning model associated with the non-produced documents and determining, based on the output of second machine learning model whether non-produced documents are of interest to the consumer party; and responding, by the producing party, to the request regarding the set of non-produced documents wherein the response comprises production of one or more of the set of non-produced documents or refusal to produce one or more of the set of non-produced documents.

2. The method of claim 1, wherein the methodology for producing the content-by-example log comprises:

generating a similarity score between each of the non-produced documents and one or more of the produced documents, the content-by-example log comprising a listing of each of the non-produced documents and the similarity score of the one or more set of produced documents.

3. The method of claim 2, wherein the methodology for producing the content-by-example log comprises selecting a method for generating similarity scores from a set of methods for generating similarity scores.

4. The method of claim 3, wherein selecting the method for generating similarity scores is based on a standard for producing the content-by-example log.

5. The method of claim 1, wherein the request from the consumer party regarding the set of non-produced documents comprises:

at least one of: a request by the consumer party to produce at least one of the non-produced documents, or a request for content-by-example criteria of at least one document in the set of non-produced documents.

6. The method of claim 5, wherein content-by-example criteria for non-produced documents comprises the comparisons within the context-by-example log.

7. The method of claim 1, wherein the methodology for producing the content-by-example log comprises:

selecting a method for generating similarity scores from a set of methods for generating similarity scores; and based on the selected method for generating similarity scores, generating a similarity score between each of the non-produced documents and one or more of the produced documents, the content-by-example log comprising a listing of each of the non-produced documents and the similarity score of the one or more set of produced documents; and wherein the request regarding one or more of the documents the set of non-produced documents comprises:

at least one of: a request by the consumer party to produce at least one of the non-produced documents, or a request for content-by-example criteria of at least one document in the set of non-produced documents.

8. A system for document production and consumption, comprising:

a processor;

a memory coupled to the processor, the memory comprising computer executable instructions that, when executed by the processor, perform a method comprising:

determining, by a producer party having access to both a set of non-produced documents of a corpus of electronic documents and a set of produced documents of the corpus of electronic documents, a methodology for producing a content-by-example log for the corpus of electronic documents, the methodology comprising a technique for comparing the set of non-produced documents of the corpus to the set of produced documents of the corpus, the content-by-example log comprising an electronic file including a comparison between the set of non-produced documents and the set of produced documents identifying a produced document with one or more of the set of non-produced documents;

producing, by the producer party, the content-by-example log and sending the content-by-example log to a consumer party, wherein producing the content-by-example log comprises applying, at the producer party computing device, a first machine model adapted to implement the methodology for comparing the set of produced documents to the corpus of electronic corpus of documents to identify the produced document with the one or more of the set of non-produced documents; and providing electronic access to the set of produced document of the electronic corpus to a consumer party such that the consumer party can access the set of produced documents of the corpus at a consumer party computer device but cannot access the set of non-produced documents corpus; and receiving a request from the consumer party regarding the set of non-produced documents, the request based on a methodology for analyzing the content-by-example log applied to the content-by-example using a second machine model at the consumer party computing device by applying the second machine learning model to evaluate attributes of the set of produced documents identified for each of the non-produced documents identified in the content-by-example log to determine one or more the set of non-produced documents identified in the content-by-example log as documents of interest to the consumer party that cannot access the non-produced documents, the application of the second machine learning model comprising:
  determining values for a set of features associated with the second machine learning model for the non-produced document; and
  applying the second machine learning model to the values for the set of features to generate output of the second machine learning model associated with the non-produced documents and determining, based on the output of second machine learning model whether non-produced documents are of interest to the consumer party; and
responding, by the producing party, to the request regarding the set of non-produced documents wherein the response comprises production of one or more of the set of non-produced documents or refusal to produce one or more of the set of non-produced documents.

9. The system of claim 8, wherein the methodology for producing the content-by-example log comprises:
  generating a similarity score between each of the non-produced documents and one or more of the produced documents, the content-by-example log comprising a listing of each of the non-produced documents and the similarity score of the one or more set of produced documents.

10. The system of claim 9, wherein the methodology for producing the content-by-example log comprises selecting a method for generating similarity scores from a set of methods for generating similarity scores.

11. The system of claim 10, wherein selecting the method for generating similarity scores is based on a standard for producing the content-by-example log.

12. The system of claim 8, wherein the request from the consumer party regarding the set of non-produced documents comprises:
  a request by the consumer party to produce at least one of the non-produced documents, or a request for content-by-example criteria of at least one document in the set of non-produced documents.

13. The system of claim 12, wherein content-by-example criteria for non-produced documents comprises the comparisons within the context-by-example log.

14. The system of claim 8, wherein the methodology for producing the content-by-example log comprises:
  selecting a method for generating similarity scores from a set of methods for generating similarity scores; and
  based on the selected method for generating similarity scores, generating a similarity score between each of the non-produced documents and one or more of the produced documents, the content-by-example log comprising a listing of each of the non-produced documents and the similarity score of the one or more set of produced documents; and wherein the request regarding one or more of the documents the set of non-produced documents comprises:
    at least one of: a request by the consumer party to produce at least one of the non-produced documents, or a request for content-by-example criteria of at least one document in the set of non-produced documents.

15. A computer program product comprising a non-transitory computer readable medium storing instructions executable by a processor to perform a method for document production and consumption, the method comprising:
  at a producer party computing device:
    determining, by a producer party having access to both a set of non-produced documents of a corpus of electronic documents and a set of produced documents of the corpus of electronic documents, a methodology for producing a content-by-example log for the corpus of electronic documents, the methodology comprising a technique for comparing the set of non-produced documents of the corpus to the set of produced documents of the corpus, the content-by-example log comprising an electronic file including a comparison between the set of non-produced documents and the set of produced documents identifying a produced document with one or more of the set of non-produced documents;
    producing, by the producer party, the content-by-example log and sending the content-by-example log to a consumer party, wherein producing the content-by-example log comprises applying, at the producer party computing device, a first machine model adapted to implement the methodology for comparing the set of produced documents to the corpus of electronic corpus of documents to identify the produced document with the one or more of the set of non-produced documents; and
  providing electronic access to the set of produced document of the electronic corpus to a consumer party such that the consumer party can access the set of produced documents of the corpus at a consumer party computer device but cannot access the set of non-produced documents corpus; and
  receiving a request from the consumer party regarding the set of non-produced documents, the request based on a methodology for analyzing the content-by-example log applied to the content-by-example using a second machine model at the consumer party computing device by applying the second machine learning model to evaluate attributes of the set of produced documents identified for each of the non-produced documents identified in the content-by-example log to determine one or more the set of non-produced documents identified in the content-by-example log as documents of interest to the consumer party that cannot access the non-produced documents, the application of the second machine learning model comprising:
    determining values for a set of features associated with the second machine learning model for the non-produced document; and
    applying the second machine learning model to the values for the set of features to generate output of the second machine learning model associated with the non-produced documents and determining, based on the output of second machine learning model whether non-produced documents are of interest to the consumer party; and
  responding, by the producing party, to the request regarding the set of non-produced documents wherein the response comprises production of one or more of the set of non-produced documents or refusal to produce one or more of the set of non-produced documents.

16. The computer program product of claim 15, wherein the methodology for producing the content-by-example log comprises:
  generating a similarity score between each of the non-produced documents and one or more of the produced documents, the content-by-example log comprising a listing of each of the non-produced documents and the similarity score of the one or more set of produced documents.

17. The computer program product of claim 16, wherein the request from the consumer party regarding the set of non-produced documents comprises:
at least one of: a request by the consumer party to produce at least one of the non-produced documents, or a request for document criteria of at least one document in the set of non-produced documents.

18. The computer program product of claim 15, wherein the request from the consumer party regarding the set of non-produced documents comprises:
a request by the consumer party to produce at least one of the non-produced documents, or a request for content-by-example criteria of at least one document in the set of non-produced documents.

19. The computer program product of claim 18, wherein content-by-example criteria for non-produced documents comprises the comparisons within the context-by-example log.

20. The computer program product of claim 15, wherein the methodology for producing the content-by-example log comprises:
selecting a method for generating similarity scores from a set of methods for generating similarity scores; and based on the selected method for generating similarity scores, generating a similarity score between each of the non-produced documents and one or more of the produced documents, the content-by-example log comprising a listing of each of the non-produced documents and the similarity score of the one or more set of produced documents; and wherein the request regarding one or more of the documents the set of non-produced documents comprises:

at least one of: a request by the consumer party to produce at least one of the non-produced documents, or a request for content-by-example criteria of at least one document in the set of non-produced documents.

* * * * *